United States Patent
Robbins et al.

(10) Patent No.: US 12,443,041 B2
(45) Date of Patent: Oct. 14, 2025

(54) OPTICAL ELEMENTS FOR REDUCING VISUAL ARTIFACTS IN DIFFRACTIVE WAVEGUIDE DISPLAYS AND SYSTEMS INCORPORATING THE SAME

(71) Applicant: Meta Platforms Technologies, LLC, Menlo Park, CA (US)

(72) Inventors: Steven John Robbins, Redmond, WA (US); Michael James Escuti, Redmond, WA (US); Jihwan Kim, Cary, NC (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 356 days.

(21) Appl. No.: 18/002,768

(22) PCT Filed: Jun. 22, 2021

(86) PCT No.: PCT/US2021/038361
§ 371 (c)(1),
(2) Date: Dec. 21, 2022

(87) PCT Pub. No.: WO2021/262641
PCT Pub. Date: Dec. 30, 2021

(65) Prior Publication Data
US 2023/0288706 A1    Sep. 14, 2023

Related U.S. Application Data

(60) Provisional application No. 63/042,021, filed on Jun. 22, 2020, provisional application No. 63/042,031, filed on Jun. 22, 2020.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0056* (2013.01); *G02B 6/0076* (2013.01); *G02F 1/0136* (2013.01); *G02B 5/3016* (2013.01)

(58) Field of Classification Search
CPC .......... G02B 27/0172; G02B 6/0056; G02B 6/0076; G02B 5/3016; G02F 1/0136
(Continued)

(56) References Cited

U.S. PATENT DOCUMENTS 9,298,041 B2    3/2016  Escuti et al.
10,545,348 B1*  1/2020  Lu ............................ G02B 3/14
(Continued)

FOREIGN PATENT DOCUMENTS

CN    110161701 A       8/2019
WO    WO-2019173390 A1  9/2019

OTHER PUBLICATIONS

International Preliminary Report on Patentability for International Application No. PCT/US2021/038361, mailed Jan. 5, 2023, 11 pages.
(Continued)

*Primary Examiner* — Jerry M Blevins
(74) *Attorney, Agent, or Firm* — Greenberg Traurig, LLP

(57) ABSTRACT

A diffractive waveguide device includes an optical waveguide and a diffractive element optically coupled to the optical waveguide. The diffractive element is configured to alter a polarization and propagation direction of light of a first polarization, and is configured to transmit light of a second polarization without substantially altering a polarization or propagation direction thereof. A polarizing film assembly is configured to provide the light of the second polarization to the optical waveguide, and/or is configured to block the light of the second polarization from the optical waveguide. The polarizing film assembly includes a polarizer and an optical retarder that is positioned between the polarizer and the optical waveguide. Related devices and methods of operation are also discussed.

20 Claims, 12 Drawing Sheets

(51) Int. Cl.
*G02F 1/01*   (2006.01)
*G02B 5/30*   (2006.01)

(58) Field of Classification Search
USPC .......................................................... 385/37
See application file for complete search history.

(56) References Cited

U.S. PATENT DOCUMENTS

| | | |
|---|---|---|
| 2011/0242461 A1 | 10/2011 | Escuti et al. |
| 2016/0033698 A1* | 2/2016 | Escuti ................... G02F 1/1334 |
| | | 349/194 |
| 2016/0077338 A1 | 3/2016 | Robbins et al. |
| 2016/0231566 A1 | 8/2016 | Levola et al. |
| 2017/0131545 A1 | 5/2017 | Wall et al. |
| 2017/0139210 A1* | 5/2017 | Vallius .................. G02B 6/0026 |
| 2017/0299941 A1* | 10/2017 | Serati ....................... G02F 1/292 |
| 2020/0050145 A1* | 2/2020 | Kim ..................... G03H 1/2286 |

OTHER PUBLICATIONS

Extended European Search Report for European Patent Application No. 21828967.6, mailed Sep. 23, 2024, 13 pages.
Partial Supplementary European Search Report for European Patent Application No. 21828967.6, dated Jun. 14, 2024, 10 pages.

* cited by examiner

Key:
Note colors represent polarization states not wavelength

- LHC
- RHC
- Plane polarized TE
- Plane polarized TM
- Mixed polarization

Key:
Note colors represent polarization states not wavelength

←------- LHC
←------- RHC
←------- Plane polarized TE
←------- Plane polarized TM
·········· Elliptically polarization Key:
Note colors represent polarization states not wavelength ← LHC
← RHC
← Plane polarized TE
← Plane polarized TM
← Elliptically polarization

OPTICAL ELEMENTS FOR REDUCING VISUAL ARTIFACTS IN DIFFRACTIVE WAVEGUIDE DISPLAYS AND SYSTEMS INCORPORATING THE SAME

CLAIM OF PRIORITY

This application claims priority from U.S. Provisional Patent Application No. 63/042,031 and U.S. Provisional Patent Application No. 63/042,021, both filed Jun. 22, 2020, in the United States Patent and Trademark Office, the disclosures of which are incorporated by reference herein in their entireties.

BACKGROUND

Waveguide displays, which may combine light from a display light source with light from the user's operating environment, may represent a form factor with many advantages over normal projection optics for near-to-eye and/or head-mounted displays. For example, the form factor of waveguide-based augmented reality (AR) systems (also referred to as mixed-reality (MR) systems) could be similar to spectacles. A large exit pupil to the eye may be generated by expanding the exit pupil of a small collimating display engine by two or more expansion mechanisms within the waveguide. For example, a diffractive exit pupil expander (EPE) may include a grating that diffracts incident light into multiple diffraction orders. The directions may be dictated by the length of the grating period. If the angle is large enough, light undergoes total internal reflection (TIR) and is trapped inside the flat glass waveguide. It can then be gradually extracted by one or more other gratings, expanding the initial beam to a desired size.

In some waveguide displays incorporating one or more diffraction gratings, light from extreme off-axis sources (e.g., ambient light from the field of view of the outside world or operating environment) may be diffracted by the diffraction grating and enter the user's eyes without waveguiding into the glass. Since the light intercepts the grating only once, the light is split up into a rainbow due to diffractive dispersion (the diffraction angle is a function of the wavelength linked by the diffraction equation). Modes of such rainbow effects may occur due to light incident on a waveguide from different directions. This is illustrated in FIG. 1A, which illustrates rainbow effects 30 due to light 10 incident on a waveguide 20 including a diffraction grating 100 from a direction in front of the user (shown as incident from above), but also may occur from a direction behind the user. For smaller form factor devices, the light from behind the user may not be as problematic since some of the light may be blocked by the user's head.

Also, forward light 10 within the display field of view may diffract into the waveguide 20 and may diffract out again, i.e., double diffraction. In this case, the dispersion may be corrected (diffractive dispersion acts in an equal and opposite direction), as shown in FIG. 1B. For light that propagates within the waveguide 20 (essentially the maximum field of view that can be supported by a single grating), light 10 from the outside world is diffracted into the waveguide 20 and the spectrum of light may be diffracted into different angles according to the diffraction equation. On subsequent encounters with the grating 100, light is diffracted towards the user's eye and the light of the different wavelengths may be diffracted into the original direction (prior to entering the waveguide 20), such that light of different wavelengths will be recombined.

However, as shown in FIG. 1A, light 10 at high angles of incidence can be diffracted to angles less than the critical angle of the waveguide 20 and may therefore be refracted out before encountering the diffraction grating 100 a subsequent time, and will therefore be split into separate wavelengths. If this light is within the exit pupil of the display, the user will observe this light as a rainbow 30.

Rainbow effects may be removed or reduced in some waveguide displays using a polarizing filter such that ambient light entering the system has a particular polarization state, as described for example in U.S. Pat. No. 10,234,686 to Vallius. The polarizing filter can be utilized in conjunction with a downstream diffractive optical element that includes diffraction grating structures that are configured for sensitivity to an opposite polarization state.

Also, as AR display systems combine the light from both a real-world scene/operating environment and a synthetic display, many AR displays may project some light in the forward direction, away from the eye. An exception to this is when the combiner of the display is a polarizing beamsplitter 60 and the display light 50 is highly polarized, as shown in FIG. 1C. However, many AR displays have an element that "leaks" some of the display light forward or have a partially reflecting surface that permits some light to propagate in the forward direction, as shown by the dashed arrow in FIG. 1C. This light may be collectively referred to as forward light leakage or forward projected light 105.

FIG. 1D illustrates the problem of forward projected light or forward light leakage 105 in greater detail. As shown in FIG. 1D, a transparent substrate is provided as a waveguide 20 incorporating one or more gratings (shown as output grating 100) that are visible to the outside world. The substrate may be or may include more than one waveguide 20, e.g., six waveguides, where the field of view may increase with the number of waveguides. Light 101 is reflected internally via total internal reflection within the waveguide 120. Light 101 intercepts the output grating 100, and is primarily diffracted 102 towards the user's eye: however, some forward projected light 105 may be present. The output grating 100 may be any of various grating types, e.g., a Surface-Relief-Grating (SRG), Volume Holographic Grating (VHG), Switchable Bragg Gratings, etc.

Many diffractive technologies may allow some light to diffract in the direction opposite to the user (referred to herein as the forward direction), which may therefore be visible to others (i.e., other than the user). This mechanism may be present for reflection or transmission gratings, and may be significant for particular grating types, e.g., SRGs. For example, some AR systems using SRGs may project light in the forward direction with a luminance of about 50% of the luminance that is projected towards the user Both reflective and diffractive waveguides may project light in the forward direction. This forward light leakage may be problematic from many perspectives, such as privacy (as others may be able to see what the user is seeing), light security (in the case of a military system, the light may provide a beacon for the enemy to shoot at), and/or socially (as the light may obscure the eyes of the user).

SUMMARY

According to some embodiments of the present disclosure, a diffractive waveguide display device or imaging system comprises one or more optical elements including: an optical waveguide comprising at least one diffractive optical element or layer, such as a polarization grating (PG) or other geometric phase (GP) hologram, that is configured to alter a polarization and propagation direction of light of a first polarization, but is configured to transmit light of a second, different (e.g., orthogonal) polarization without substantially altering a polarization or propagation direction thereof; and a film assembly that is arranged to interact with light from the optical waveguide (or the at least one diffractive layer thereof), and/or vice versa. The film assembly is configured to provide polarized light of the second polarization to the optical waveguide, and/or is configured to block polarized light output from the optical waveguide. The film assembly includes at least one polarizer and at least one first retarder element, with the retarder element positioned between the polarizer and the diffractive layer(s) of the optical waveguide.

In some embodiments, the film assembly may be arranged between an ambient or unpolarized light source and the optical waveguide, with an air gap therebetween.

In some embodiments, a spatially varying retarder layer or element is provided, which is configured to control the spatial dependence of the diffraction efficiency of the at least one diffractive layer. For example, the spatially varying retarder may include a local optical axis pattern, twist angle, and/or thickness that are configured to increase a uniformity of the intensity of light output from the optical waveguide(s) by providing a spatially varying retardation of the light incident thereon. The spatially varying retarder may be included in the first optical waveguide, for example, adjacent to or separated or spaced apart from the diffractive layer.

In some embodiments, a second optical waveguide is arranged to interact with light from the first optical waveguide. The second optical waveguide includes a second diffractive layer or element. A second film assembly is provided between the second diffractive layer of the second optical waveguide and the first optical waveguide. The second film assembly includes a second spatially varying retarder that is configured to compensate for optical effects of the first spatially varying retarder of the first optical waveguide.

In some embodiments, the second film assembly may be a separate element from or independent of the second optical waveguide.

In some embodiments, the second film assembly may be included in the second optical waveguide.

In some embodiments, the second optical waveguide may include a third spatially varying retarder. In some embodiments, the third spatially varying retarder is configured to control the spatial dependence of the diffraction efficiency of the second diffractive layer. In some embodiments, the third spatially varying retarder is configured to compensate for optical effects of the second spatially varying retarder.

According to some embodiments of the present disclosure, a diffractive waveguide device includes an optical waveguide: a diffractive element optically coupled to the optical waveguide, where the diffractive element is configured to alter a polarization and propagation direction of light of a first polarization, and is configured to transmit light of a second polarization without substantially altering a polarization or propagation direction thereof; and a polarizing film assembly that is configured to provide the light of one of the first or second polarization to the optical waveguide, and/or is configured to block the light of the one of the first or second polarization from the optical waveguide. The polarizing film assembly includes a polarizer and an optical retarder that is positioned between the polarizer and the optical waveguide.

In some embodiments, the polarizing film assembly is arranged to provide the light of the second polarization to the optical waveguide responsive to non-display light that is incident on a surface of the polarizing film assembly opposite the optical waveguide. The light of the second polarization may be substantially free of the first polarization.

In some embodiments, the optical waveguide is configured to transmit the non-display light from a surface of the optical waveguide such that the non-display light that is transmitted includes the light of the second polarization and is substantially free of rainbow artifacts. The non-display light that is transmitted may be substantially free of the light of the first polarization.

In some embodiments, the optical waveguide is configured to propagate display light from an electronic imaging display by total internal reflection, and outcouple the display light from the surface of the optical waveguide.

In some embodiments, the diffractive element is configured to alter the polarization and the propagation direction of the display light toward the surface of the optical waveguide. The display light that is outcoupled includes the light of the first polarization, and may be substantially free of the light of the second polarization.

In some embodiments, the first and second polarizations are orthogonal to one another.

In some embodiments, one of the first and second polarizations is right-handed circular polarization, and another of the first and second polarizations is left-handed circular polarization.

In some embodiments, the optical retarder is a multi-twist retarder comprising stacked birefringent sublayers having respective retardations and respective local optical axes that are rotated by respective twist angles over respective thicknesses thereof, where at least two of the respective twist angles and/or the respective thicknesses are different among the stacked birefringent sublayers.

In some embodiments, the stacked birefringent sublayers are liquid crystal polymer layers.

In some embodiments, the optical retarder comprises a switchable retarder element that is configured to be switched between different first and second retardation states. The polarizing film assembly is configured to provide the light of the second polarization to the optical waveguide in the first retardation state, and to block the light of the second polarization from the optical waveguide in the second retardation state.

In some embodiments, the polarizing film assembly is a switchable circular polarizer.

In some embodiments, the polarizer is a linear polarizer. One of the first and second retardation states is configured to provide halfwave retardation, and another of the first and second states is configured to provide zero retardation. The optical retarder further includes a quarter wave plate between the linear polarizer and the optical waveguide.

In some embodiments, the optical retarder includes a variable retarder element that is configured to vary retardation presented to incident light based on angles of incidence of the incident light, wavelengths of the incident light, and/or spatial positions in one or more directions along a surface of the variable retarder element.

In some embodiments, the variable retarder is configured to provide a first retardation for the angles of incidence that are within a field of view of the diffractive waveguide device and a second retardation, which is different from the first retardation, for the angles of incidence that are outside the field of view. The polarizing film assembly is configured to provide the light of the second polarization to the optical waveguide for the angles of incidence that are outside the field of view, and block the light of the second polarization from the optical waveguide for the angles of incidence that are within the field of view.

In some embodiments, a spatially varying retarder is arranged to receive light output from the diffractive element and configured to spatially vary retardation of light incident thereon in one or more directions along a surface thereof.

In some embodiments, the spatially varying retarder is configured to vary a diffraction efficiency of the diffractive element in the one or more directions, and may provide light output with substantially uniform intensity from a surface of the optical waveguide opposite the film assembly.

In some embodiments, the spatially varying retarder includes a local optical axis pattern, twist angle, and/or thickness configured to spatially vary the retardation.

In some embodiments, the diffractive element and/or the spatially varying retarder are included in the optical waveguide.

In some embodiments, the optical waveguide is a first optical waveguide. The diffractive waveguide device further includes a second optical waveguide that is arranged to receive light output from the first optical waveguide, and a second diffractive element optically coupled to the first optical waveguide. The second diffractive element is configured to alter a polarization and propagation direction of light of the first polarization, and is configured to transmit light of the second polarization without substantially altering a polarization or propagation direction thereof.

In some embodiments, a second film assembly is provided between the second diffractive element and the first optical waveguide. The second film assembly includes a second spatially varying retarder that is configured to spatially vary retardation of light incident thereon in one or more directions along a surface thereof.

In some embodiments, the second spatially varying retarder includes a local optical axis pattern, twist angle, and/or thickness configured to spatially vary the retardation inversely to that of the spatially varying retarder of the first optical waveguide.

In some embodiments, the second optical waveguide further includes a third spatially varying retarder that is arranged to receive light output from the second diffractive element and is configured to spatially vary retardation of light incident thereon in one or more directions along a surface thereof.

In some embodiments, the third spatially varying retarder is configured to vary a diffraction efficiency of the second diffractive element in the one or more directions to provide light output with substantially uniform intensity.

In some embodiments, the second film assembly is distinct from the second optical waveguide.

In some embodiments, the second film assembly is included in the second optical waveguide. The third spatially varying retarder includes a local optical axis pattern, twist angle, and/or thickness configured to spatially vary the retardation inversely to that of the second spatially varying retarder.

In some embodiments, a third optical waveguide is arranged to receive light output from the second optical waveguide, and a third diffractive element is optically coupled to the third optical waveguide. The third diffractive element is configured to alter a polarization and propagation direction of light of the first polarization, and is configured to transmit light of the second polarization without substantially altering a polarization or propagation direction thereof.

In some embodiments, a third film assembly is arranged between the third diffractive element and the second optical waveguide. The third film assembly includes a fourth spatially varying retarder that is configured to spatially vary retardation of light incident thereon in one or more directions along a surface thereof.

In some embodiments, the first, second, and third optical waveguides are configured to operate on light of respective wavelength ranges corresponding to respective colors of a visible spectrum.

In some embodiments, a diffraction efficiency of the diffractive element varies in one or more directions along a surface thereof to provide light output with substantially uniform intensity from a surface of the optical waveguide opposite the film assembly.

In some embodiments, the diffractive element is a multi-slant grating including stacked birefringent sublayers having respective thicknesses, slant angles, and/or chirality parameters that are configured to direct the display light toward the surface of the optical waveguide that is opposite the polarizing film assembly, and simultaneously direct residual light away from the surface of the optical waveguide.

In some embodiments, at least two of respective thicknesses, slant angles, and/or chirality parameters may be different among the stacked birefringent sublayers.

In some embodiments, a ratio of an intensity of the display light that is outcoupled from the surface of the optical waveguide compared to the residual light that is directed away from the surface of the optical waveguide is greater than about 10 to 1.

According to some embodiments of the present disclosure, a diffractive waveguide device includes an optical waveguide comprising opposing first and second surfaces, where the optical waveguide is configured to propagate display light from an electronic imaging display by total internal reflection, and to outcouple the display light from the second surface; and a diffractive element optically coupled to the waveguide. The diffractive element is configured to alter a polarization and propagation direction of light of a first polarization, and is configured to transmit light of a second polarization without substantially altering a polarization or propagation direction thereof. The diffractive element includes a plurality of stacked birefringent sublayers having respective thicknesses, slant angles, and/or chirality parameters that are configured to direct the display light toward the second surface of the optical waveguide, and simultaneously direct residual light of a lower intensity than the display light toward the first surface of the optical waveguide.

In some embodiments, a ratio of an intensity of the display light that is outcoupled from the surface of the optical waveguide compared to the residual light that is directed away from the surface of the optical waveguide is greater than about 10 to 1.

In some embodiments, the display light that is outcoupled includes the light of the first polarization, and may be substantially free of the light of the second polarization. The residual light includes the light of the second polarization, and may be substantially free of the light of the first polarization.

In some embodiments, a polarizing film assembly is configured to block the light of the second polarization that is outcoupled from the first surface of the optical waveguide.

In some embodiments, the polarizing film assembly includes a polarizer and an optical retarder that is positioned between the polarizer and the first surface of the optical waveguide.

In some embodiments, the polarizing film assembly is further configured to provide the light of the second polarization to the optical waveguide responsive to non-display light that is incident on a surface of the polarizing film assembly that is opposite the optical waveguide.

In some embodiments, the optical retarder includes a switchable retarder element that is configured to be switched between different first and second retardation states. The polarizing film assembly is configured to provide the light of the second polarization to the optical waveguide in the first retardation state, and to block the light of the second polarization that is outcoupled from the first surface of the optical waveguide in the second retardation state.

In some embodiments, the polarizer is a linear polarizer, where one of the first and second retardation states is configured to provide halfwave retardation, and another of the first and second states is configured to provide zero retardation. The optical retarder further includes a quarter wave plate between the linear polarizer and the optical waveguide.

According to some embodiments of the present disclosure, a diffractive waveguide device includes an optical waveguide assembly comprising a plurality of optical waveguides arranged sequentially, with each of the optical waveguides comprising a respective diffractive element and a respective spatially varying retarder that is configured to interact with light from the respective diffractive layer in order to generate a respective gradient of diffraction efficiency. The diffractive waveguide device further includes a polarizing film assembly comprising a polarizer and a retarder element. The polarizing film assembly is configured to provide polarized light of the second polarization to the optical waveguide assembly, and/or is configured to block polarized light output from the optical waveguide assembly.

In some embodiments, the diffractive element comprises a geometric phase element comprising local optical axis orientations that vary in one or more dimensions.

In some embodiments, the diffractive element comprises a polarization grating comprising local optical axis orientations that vary linearly in one or more dimensions and define respective grating periods.

In some embodiments, wherein the diffractive element comprises a transmissive or reflective Bragg polarization grating that is configured to output the light of the second polarization into a zero-order beam and the light of the first polarization into a first-order beam, wherein a difference between the propagation directions of the zero- and first-order beams is greater than about 45 degrees.

In some embodiments, the light of the first and/or second polarization comprises light of a visible wavelength range.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

Figure 1A:
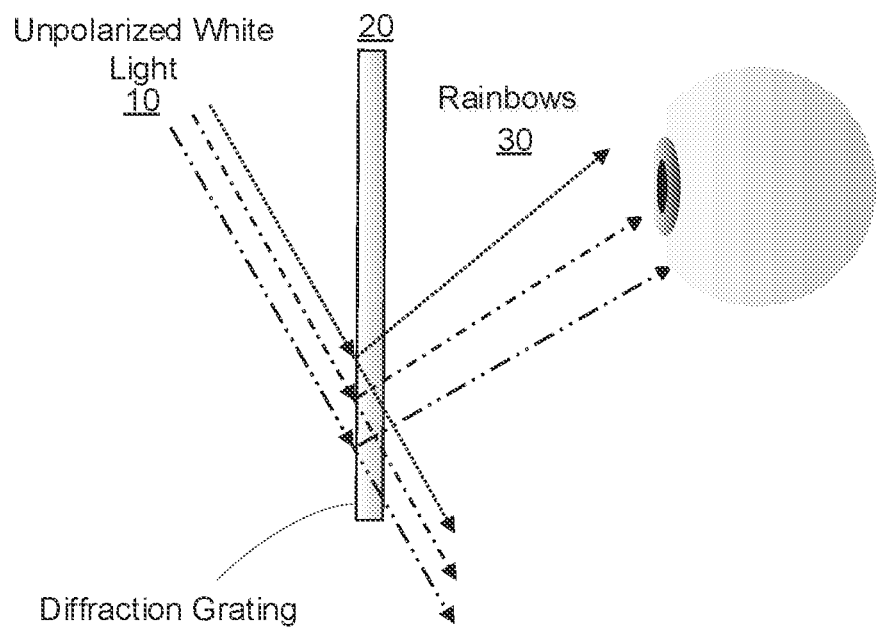
FIG. 1A is a schematic diagram illustrating rainbow effects due to diffractive dispersion incident light on a waveguide display.
Figure 1B:
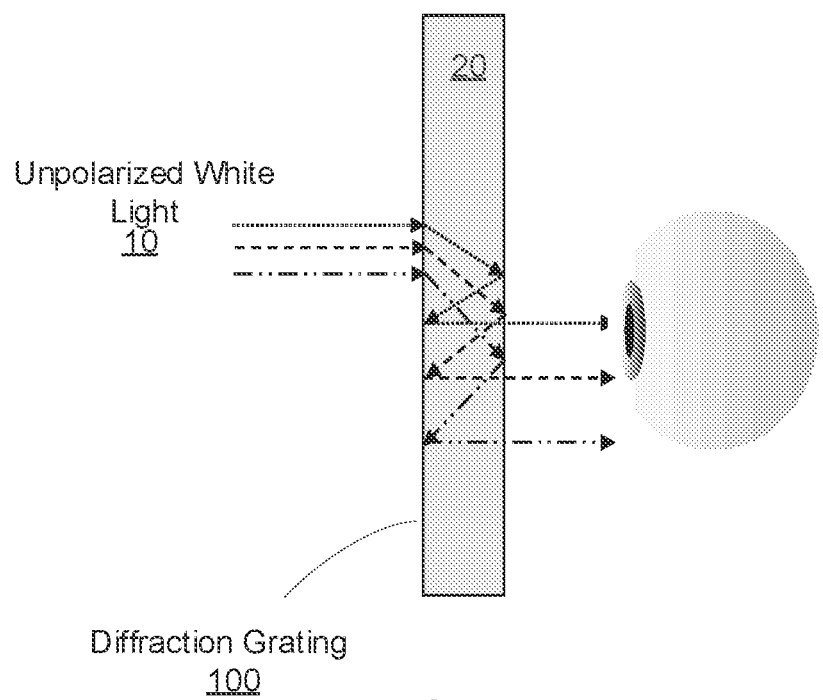
FIG. 1B is a schematic diagram illustrating correction of diffractive dispersion incident light on a waveguide display via double diffraction.
Figure 1C:
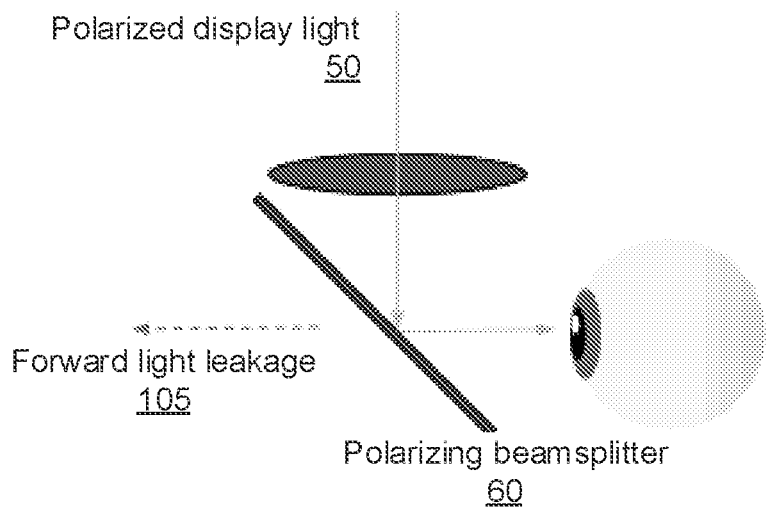
FIG. 1C is a schematic diagram illustrating forward light leakage in an AR eyepiece including a polarizing beamsplitter.
Figure 1D:
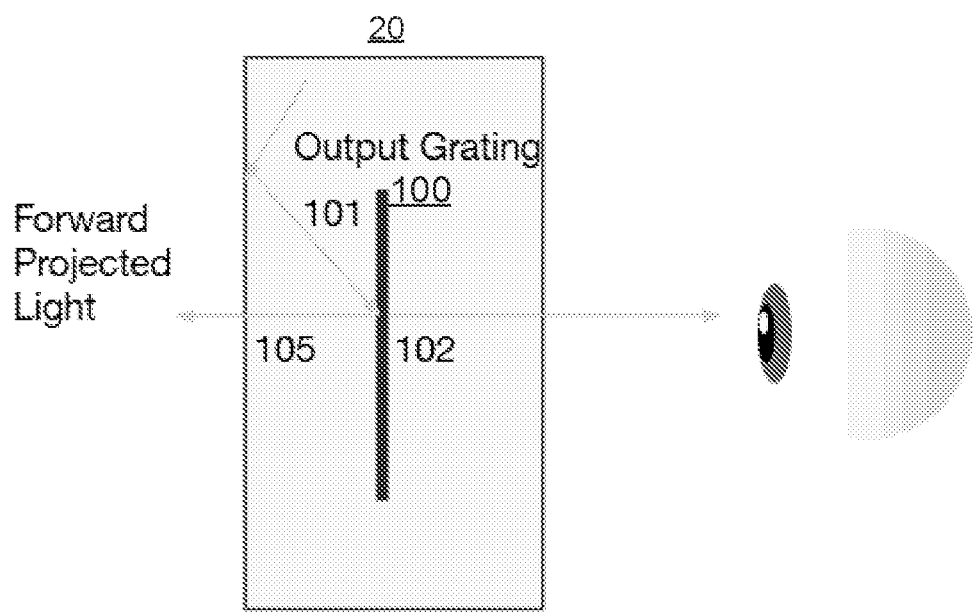
FIG. 1D is a schematic diagram illustrating forward projected light in a waveguide display in greater detail.

As used herein, a diffractive optical element or layer may be wavelength and/or polarization selective, and may be configured to alter both the polarization and the propagation direction of light incident thereon. For example, the diffractive layer may be one or more diffractive gratings, such as polarization gratings (PGs) or other geometric phase holograms (GPHs), configured to alter a polarization and propagation direction of light within a first wavelength range and/or first polarization, but configured to transmit light within a second, different wavelength range and/or second, different (e.g., orthogonal) polarization without substantially altering a polarization or propagation direction thereof. In some embodiments, the diffractive layer may polarize and diffract incident light having the specified polarization and/or wavelengths of operation into respective beams (e.g., zero-order output light that substantially maintains the direction of propagation of the incident light, and first-order output light that alters the direction of propagation relative to the incident light: also referred to as transmitted light and diffracted (or reflected) light, respectively) having different polarization states and/or different directions of propagation without substantial absorption of any one polarization state. In some embodiments, the diffraction orders may be approximately circularly polarized with the opposite handedness.

As used herein, a "retarder" or "waveplate" may be used interchangeably, and the following additional terms are also to be considered equivalent, unless otherwise indicated: any "retardation plate." "compensation film," and "birefringent plate" that is uniaxial, biaxial, or inhomogeneous. Retarders as described herein may be broadband (i.e., achromatic) or narrowband (i.e., chromatic). Retarders as described herein may therefore accomplish a polarization change via optical rotation or birefringence retardation, or any combination thereof. In some embodiments, the retarders described herein may not significantly affect or alter the direction of propagation of light passing therethrough. In some embodiments, the retarders described herein may respond to an applied electrical voltage.

Embodiments of the present disclosure may arise from realization that, for many grating technologies, the polarization state of the diffracted light in an optical waveguide is mixed (i.e., is not one pure polarization state). As noted above, optical waveguides may combine light from a light source of the display (also referred to herein as "display light") with light from the user's operating environment (also referred to herein as "non-display light"). The display light and the non-display light may have mixed polarizations, where the display light primarily includes light in visible wavelength ranges, while the non-display light may include light in the visible and non-visible wavelength ranges.

Embodiments of the present disclosure provide imaging systems, such as diffractive waveguide displays, including assemblies of one or more optical elements that are configured to direct display and non-display light into respective (e.g., orthogonal) polarization states for output to a user of the display, for example, with the display light having a substantially same (first) polarization, and the non-display light having a substantially same (second) polarization, which is different than (e.g., orthogonal to) the first polarization. In particular, some embodiments described herein include at least one optical waveguide comprising a diffractive layer that is configured to alter a polarization and propagation direction of light such that the light is directed toward a user's eye with a first polarization, but is configured to transmit light of a second, different (e.g., orthogonal) polarization without substantially altering a polarization or propagation direction thereof; and a film assembly that is configured to provide polarized light of the second polarization to the optical waveguide(s), and/or is configured to block polarized light output from the optical waveguide(s), so as to reduce or prevent rainbow artifacts and/or forward light leakage.

It will be understood that, while illustrated herein in some examples with reference to a single waveguide (e.g., the substrate 120 of FIGS. 2A-2B), embodiments described herein can include more than one waveguide, including up to and not limited to six or more waveguides (including planar and/or curved waveguides), where the field of view may increase with the number of waveguides. Also, in embodiments including multiple waveguides, each waveguide may be configured to operate on light of a particular or respective wavelength range, where the respective wavelength ranges may or may not correspond to respective colors of light, and may or may not overlap with one another. Furthermore, it will be understood that embodiments described herein are not limited to the particular polarizations and/or propagation directions shown by way of the examples described herein. Refraction at interfaces between elements or layers is not shown in the figures for ease of illustration.

Figure 2A:
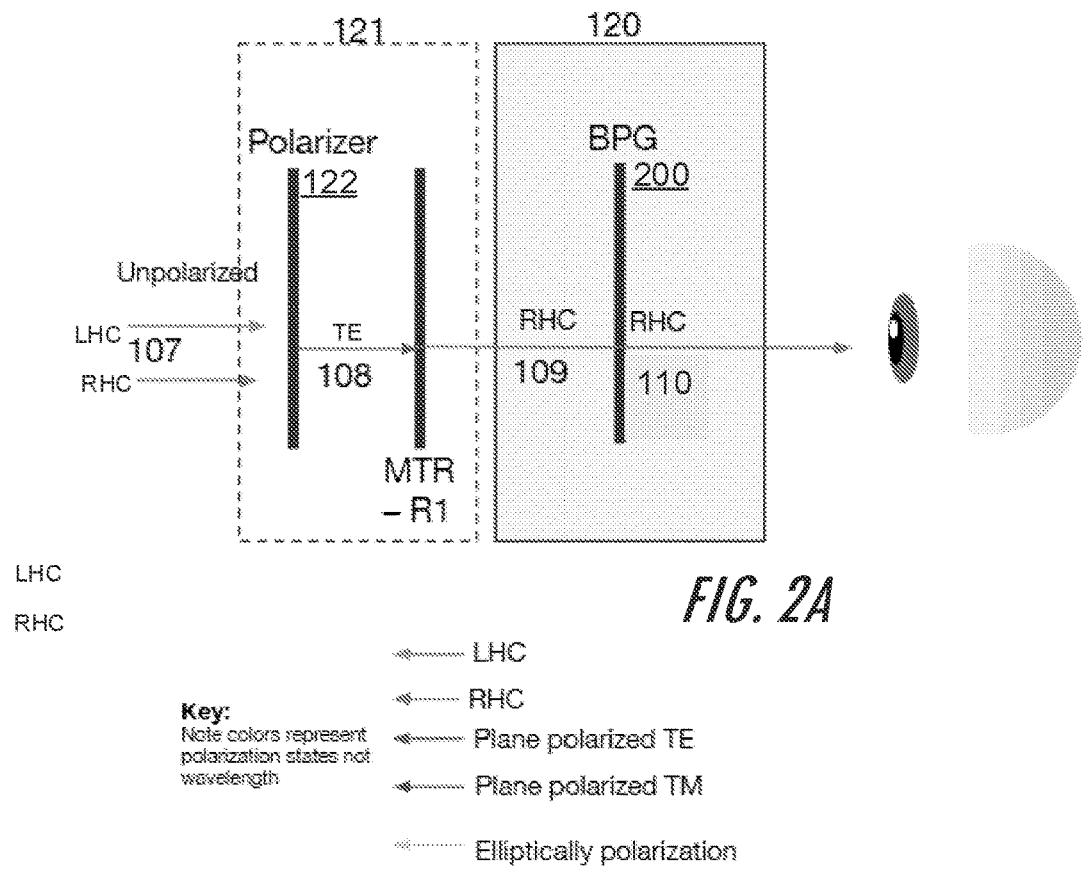
FIGS. 2A and 2B are schematic diagrams illustrating rainbow reduction and forward light leakage reduction, respectively, in diffractive waveguide devices according to some embodiments of the present invention.
Figure 2B:
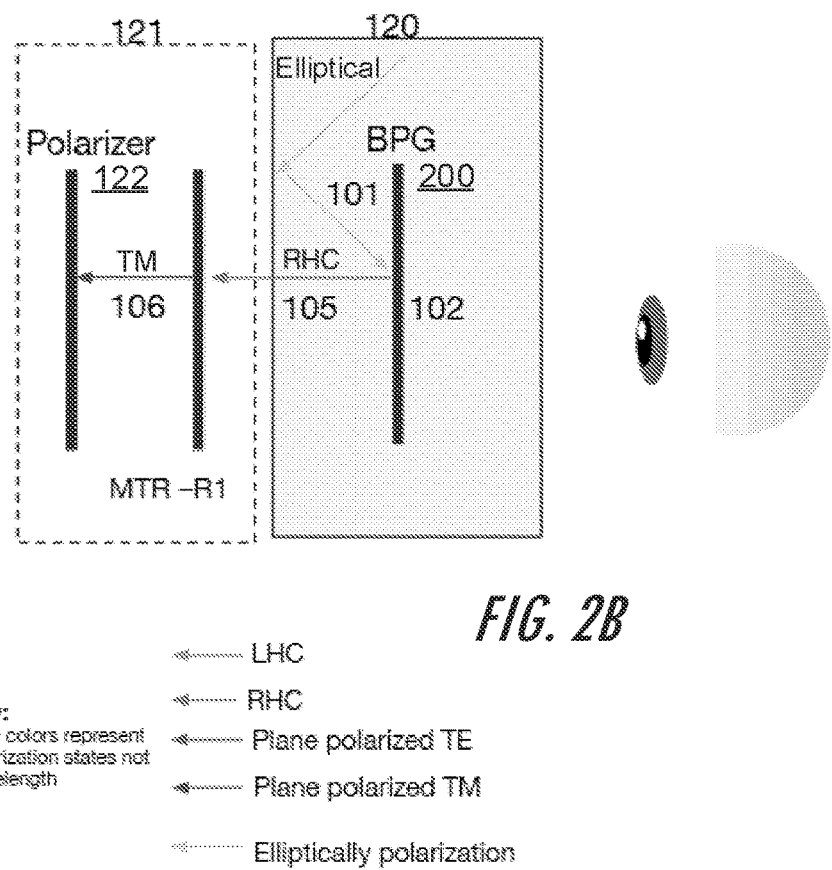

In some embodiments, as shown in FIGS. 2A and 2B, an optical waveguide 120 is optically coupled to a polarization grating (PG) as the diffractive element 200, illustrated by way of example herein as a Bragg polarization grating (BPG). Bragg PGs (BPGs) can be designed or otherwise configured such that light from the outcoupling grating of a waveguide display can be almost purely a single polarization state (e.g., a first polarization state) across a broad angle and spectrum. In addition, the light of a second (e.g., orthogonal) polarization state is substantially unaffected or at least has low diffraction by the BPG. That is, the waveguide 120 may include or may otherwise be optically coupled to a diffractive layer 200 (e.g., a BPG) designed or otherwise configured to provide high diffraction efficiency into a first-order direction (e.g., about 80% or more) for light of one polarization state, and to provide low diffraction efficiency into a first-order direction (e.g., about 10% or less) for light of a different (e.g., orthogonal) polarization state, with the majority of the light being transmitted in the zero-order direction. BPGs as described herein may be configured such that a difference between directions or angles of propagation of a zero-order (i.e., undiffracted) beam and a first-order beam is greater than about 45 degrees, greater than about 60 degrees, or up to about 90 degrees or more, responsive to receiving the light at the angle of incidence that is approximately equal to the Bragg angle. BPGs described herein may be transmissive or reflective, and/or may be varying in period, orientation, and/or lensing effects.

In the examples described herein, the two polarization states are circularly polarized light, that is, left hand circular LHC polarized (with high diffraction efficiency by the BPG) and right hand circular RHC polarized (with low diffraction efficiency by the BPG). However, it will be understood that other embodiments may employ diffractive elements that are configured to diffract the inverse polarizations (e.g., RHC with high diffraction efficiency and LHC with low diffraction efficiency), non-circular polarizations, non-orthogonal polarizations, and/or BPGs or other diffractive layers that are less efficient.

As shown in FIGS. 2A and 2B, a polarizing film assembly 121 includes a polarizer 122 and an optical retarder MTR (shown as MTR-R1) arranged at the front (e.g., facing the field of view or operating environment) of the waveguide 120. In some embodiments, the retarder may be a uniaxial quarter-waveplate. In some embodiments, the retarder may be a multi-twist retarder, described for example in U.S. Patent Application Publication No. 2013/0027656 to Escuti, et al., the disclosure of which is incorporated by reference herein. The multi-twist retarder MTR may include stacked birefringent sublayers having respective phase retardation angles and respective local optical axes that are rotated by respective twist angles over respective thicknesses and aligned along respective interfaces between layers, where the respective twist angles and/or the respective thicknesses are different among the layers, and may be implemented by liquid crystal layers (such as liquid crystal polymer layers) in some embodiments.

The embodiment of FIG. 2A may be configured to reduce or eliminate see-through rainbow effects or artifacts. In particular, as shown in the example operation of FIG. 2A, unpolarized light 107 (e.g., non-display light from the field of view of the outside world or operating environment) is incident on the film assembly 121. This unpolarized light 107 is plane or linearly polarized by the polarizer 122 and is output as TE (transverse electric) polarized light 108. The TE polarized light 108 intercepts the retarder MTR-R1, where it is transformed into RHC polarized light 109. The RHC polarized light 109 exits the film assembly 121 and enters another substrate 120, which is the display waveguide. In this embodiment, the film assembly 121 acts as a circular polarizer by way of example only.

In some embodiments, the polarizing film assembly 121 and the substrate or waveguide 120 may be separated by a gap, such as an air gap that provides at least one air interface between the elements 121 and 120. Elements illustrated herein surrounded by dashed lines (such as the film assembly 121) may indicate that elements may or may not be monolithic in some embodiments. Also, while primarily illustrated with reference to diffractive elements that are integral to or included in respective optical waveguides, it will be understood that the diffractive elements or layers described herein may be otherwise optically coupled to the waveguides, for example, distinct from or external to (e.g., stacked on a surface of) the waveguides in some embodiments.

Still referring to FIG. 2A, the film assembly 121 provides the RHC polarized light 109 incident on the waveguide 120, and the RHC polarized light 109 is transmitted to the BPG 200. The BPG 200 is a (here, transmissive) outcoupling grating configured to outcouple one or more optical beams toward the eye of the user. As the BPG 200 in this example is configured to provide low diffraction efficiency for RHC polarized light 109, the RHC polarized light 109 therefore passes through the BPG 200 as zero-order (transmitted, or T(0))) light, and the transmitted light 110 remains RHC polarized. Since the BPG 200 is configured with low diffraction efficiency for the particular polarization of the incident light 109, the incident light 109 is transmitted through the BPG 200 without substantial altering its polarization and/or propagation direction (e.g., the BPG does not substantially diffract the incident light 109), there may be little to no dispersion, and therefore, see-through rainbow artifacts are reduced and/or not generated at an output surface of the waveguide 120. That is, the transmitted light 110 may include non-display light from the field of view of the outside world or operating environment, but may be substantially free of rainbow effects or artifacts.

The embodiment shown in FIG. 2B may be similarly configured to reduce or eliminate forward light projection, as light 101 (described primarily herein with respect to display light, but also including light from other sources, such as for general illumination) that is reflected internally via total internal reflection within the waveguide 120 intercepts the output grating 200. This light 101 is transformed into RHC polarized light 105 and is diffracted in the forward direction away from the user's eye. The light 105 intercepts the retarder MTR-R1 where it is transformed into TM polarized light 106, which is blocked by the polarizer 122 such that forward light projection beyond the film assembly 121 is reduced or prevented.

Figure 3A:
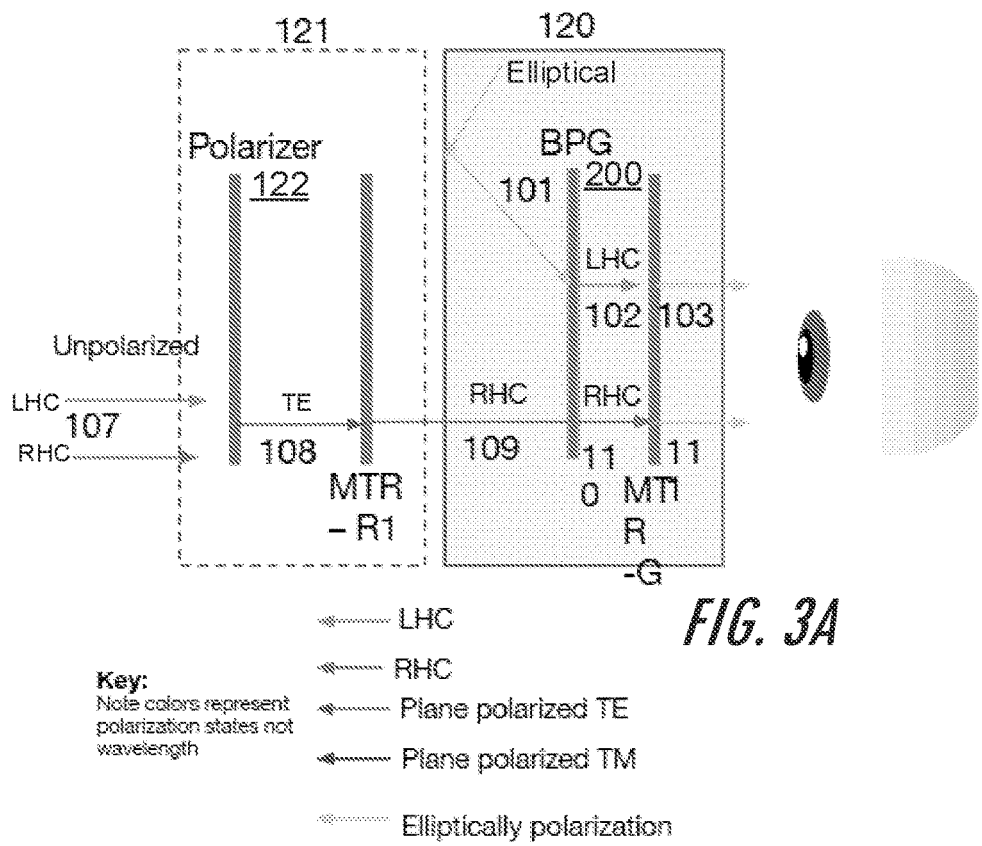
FIGS. 3A and 3B are schematic diagrams illustrating rainbow reduction and forward light leakage reduction, respectively, in diffractive waveguide devices according to further embodiments of the present invention.
Figure 3B:
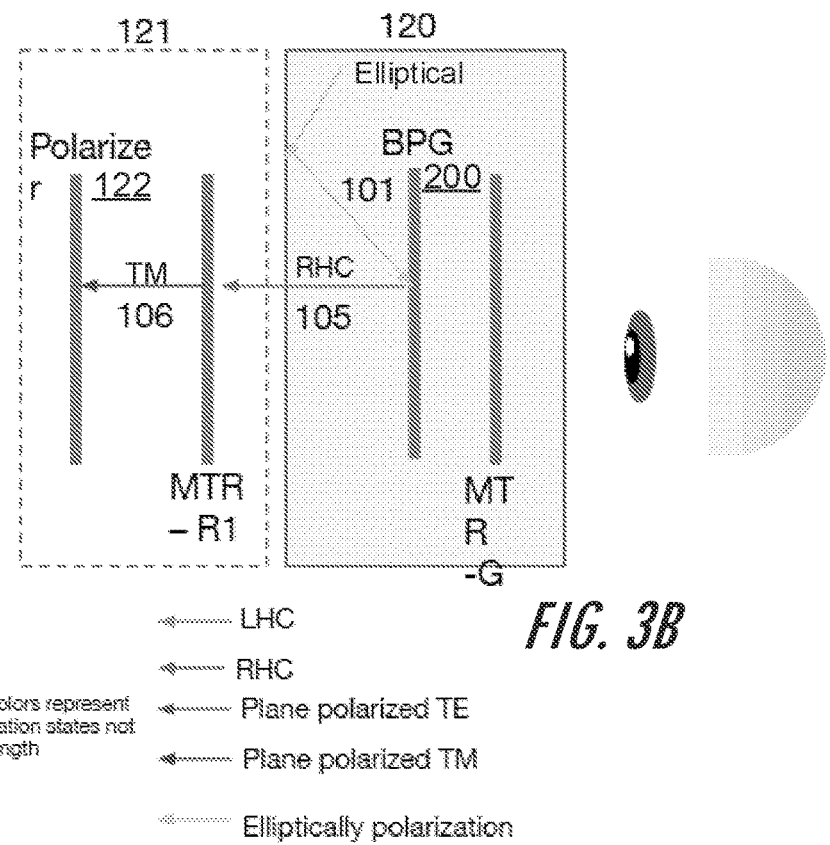

In some embodiments, as shown in FIGS. 3A and 3B, an optical waveguide 120 includes or is otherwise optically coupled to a diffractive element 200, illustrated in this example as a BPG that is designed or otherwise configured to provide high diffraction efficiency for light of one polarization state (in this example, LHC), and to provide low diffraction efficiency for light of a different (e.g., orthogonal) polarization state (in this example, RHC). While described herein with reference to transmissive BPGs (where the light 101 within the waveguide 120 is transmitted through the BPG to the user), it will be understood that reflective BPGs may be alternatively implemented, or vice vera, in any of the embodiments describe herein. The embodiments of FIGS. 3A and 3B may be similar to FIGS. 2A and 2B, that is, with a film assembly 121 including a polarizer 122 and retarder MTR (shown as MTR-R1) arranged at the front (e.g., facing the field of view or environment) of the waveguide 120.

In the examples of FIGS. 3A and 3B, a spatially varying retarder MTR-G is included (e.g., in the waveguide 120 and configured to interact with light from the diffractive layer 200, again illustrated as a BPG) in order to collectively generate a gradient of diffraction efficiency, which may increase a uniformity of the intensity of light output from the waveguide 120 (e.g., such that the light output from the waveguide 120 has a substantially uniform intensity). For example, the retarder MTR-G may include one or more layers configured to control the spatial dependence of the diffraction efficiency of the diffractive layer(s) by providing one or more features or characteristics (e.g., optical axis orientation, thickness, and/or twist angle) that are configured to provide a spatially varying retardation of the light incident thereon over a wide wavelength range (e.g., achromatic) and wide angular range. In some embodiments, the spatially varying retarder MTR-G may have local optical axis orientations that vary in one or more dimensions (e.g., x- and/or y-dimensions, linearly or nonlinearly) in a plane defined by a surface thereof or interface with the diffractive layer, where the variation in local optical axis orientations is configured to provide the spatially varying retardation. In some embodiments, the retarder(s) MTR may include a multi-twist retarder including two or more stacked layers having different twist angles over respective layer thicknesses and/or different layer thicknesses (e.g., in the z-dimension) that are configured to provide the spatially varying retardation.

The features or characteristics of the spatially varying retarders described herein may be configured based on the polarization of light that is configured to be output from a respective diffractive layer or grating. Spatially varying retarders and interoperations with diffractive layers of a waveguide are described in greater detail in U.S. Provisional Patent Application No. 63/042,021 to Robbins et al., the disclosure of which is incorporated by reference herein in its entirety. In some embodiments, the diffractive layer 200 or BPG itself may be configured to provide a spatially varying diffraction efficiency (such that the BPG/spatially varying retarder combinations described herein may be replaced by a single element). For example, the diffractive layer 200 may include local optic axis orientations that spatially vary in one or more dimensions along a surface thereof to define respective local grating periods, where the local optic axis orientations vary nonlinearly within the respective local grating periods in the one or more dimensions. The nonlinear variation in the optic axis orientations may be substantially similar or may differ among two or more of the respective local grating periods in the one or more dimensions. Diffraction gratings with spatially varying nonlinear optical axis orientation profiles are described in greater detail in U.S. Provisional Patent Application No. 63/042,046 to Escuti et al., the disclosure of which is incorporated by reference herein in its entirety.

As shown in FIG. 3A, the display light 101 from the waveguide 120 is directed to the user's eye. In particular, the optical waveguide 120 includes a transparent substrate that is configured to reflect the display light 101 from an electronic imaging display internally via total internal reflection, such that the display light 101 propagates within the waveguide 120. The BPG 200 is configured to diffract the display light 101 to be outcoupled from a surface of the waveguide 120 opposite the polarizing film assembly 121. In particular, the BPG 200 alters the polarization and propagation direction of the display light 101 and outputs light 102. The light 102 that is diffracted by the BPG 200 into the first-order will have a designed polarization (here, LHC), which may be determined primarily by the configuration of the BPG 200 itself and may not generally be dependent on the incident display light 101. The spatially varying retarder MTR-G then transforms the diffracted light 102 output from the BPG 200 (e.g., LHC-polarized) into elliptical/mixed polarization light 103 for output to the user.

The embodiment of FIG. 3A may also be configured to reduce or eliminate see-through rainbows. In particular, as shown in the example operation of FIG. 3A, unpolarized light 107 (e.g., ambient or other non-display light from the field of view of the outside world or operating environment) is incident on the film assembly 121. This unpolarized light 107 is plane or linearly polarized by the polarizer 122 and is output as TE polarized 108. The TE polarized light 108 intercepts the retarder MTR-R1, where it is transformed into right hand circular (RHC) polarized light 109, which is substantially free of the orthogonal polarization (here, LHC). The RHC polarized light 109 exits the film assembly 121 and enters the waveguide substrate 120 including the BPG 200. As the BPG 200 in this example is configured to provide low diffraction efficiency for RHC polarized light 109, the RHC polarized light 109 therefore passes through the BPG 200 as zero-order (transmitted, or T(0))) light and the polarization remains RHC 110. This light 110 intercepts the MTR-G, which transforms the light 110 to elliptically polarized light 111.

The embodiment shown in FIG. 3B may be similarly configured to reduce or eliminate forward light projection 105, and may operate in the manner described above with reference to the embodiment of FIG. 2B, such that forward light projection beyond the film assembly 121 is reduced or prevented.

In the examples of FIGS. 3A and 3B including single waveguide 120, the addition of the spatially varying retarder MTR-G to generate a gradient of diffraction efficiency may not be relevant to reducing rainbows. However, the inclusion of one or more additional optical waveguides (in combination with the spatially varying retarder MTR-G of the waveguide 120) may introduce complexities, particularly with respect to reduction of rainbow effects and forward light leakage, as illustrated in FIGS. 4A and 4B, respectively.

Figure 4A:
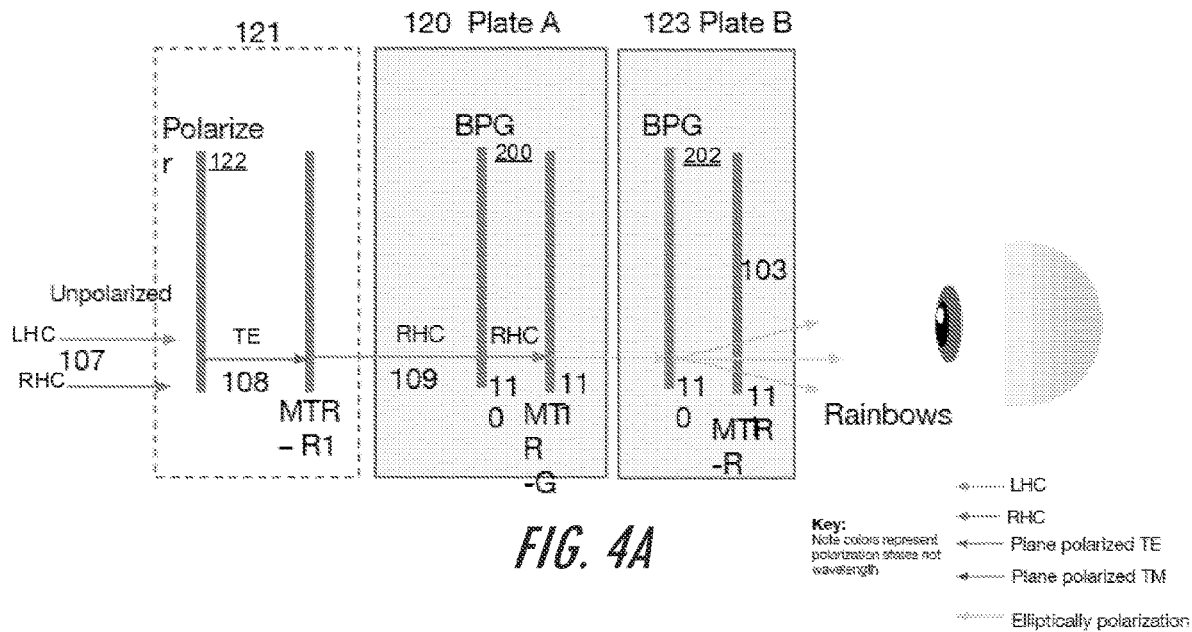
FIGS. 4A and 4B are schematic diagrams illustrating rainbow effects and forward light leakage, respectively, in a multi-waveguide arrangement.

In particular, as shown in FIG. 4A with reference to rainbow effects, the light output of the first waveguide 120 (Plate A) includes both display light 103 and the 'real world' transmitted light (e.g., the transmitted portion 111 of the unpolarized or non-display light 107 from the user's environment) of mixed polarization. If not corrected, rainbow effects may be generated by the diffraction grating 202 (shown as a second BPG) of the next or subsequent waveguide 123 (Plate B) in the arrangement.

Figure 4B:
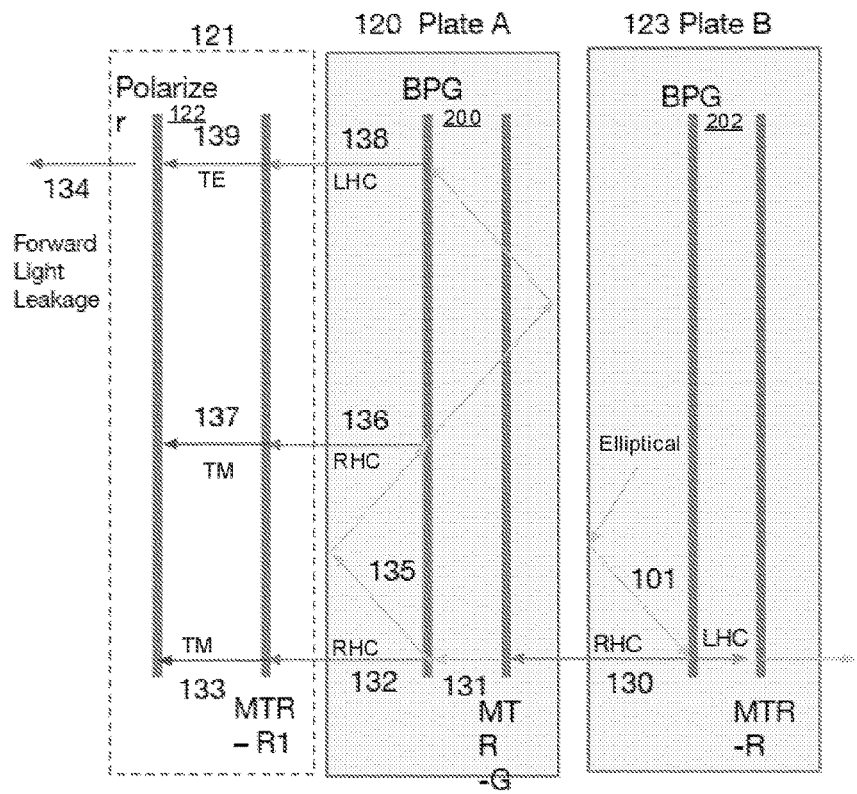

Also, as shown in FIG. 4B with reference to forward light projection, the light 101 propagating in a second waveguide 123 (Plate B) may be at least partially forward diffracted by the second BPG 202 of the second waveguide 123 and converted to (in this example) RHC polarized light 130. This light 130 is transmitted through the spatially varying retarder MTR-G of the first waveguide 120 (Plate A) and becomes elliptically/mixed polarized light 131. The RHC portion of mixed polarization light 131 may pass through the first BPG 200 unchanged, as light 132. This light 132 may be transmitted through the retarder MTR-R1 of the film assembly 121, be transformed into TM (transverse magnetic) plane polarized or linearly polarized light 133, and may be effectively blocked by the polarizer 121.

However, still referring to FIG. 4B, the remainder of mixed polarization light 131 (i.e., the LHC polarized portion) may be diffracted 135 by the first BPG 200 in the first waveguide 120 (Plate A) and may be partially diffracted out again as light 136 on a subsequent encounter with the first BPG 200, and possibly also again as light 138 on the subsequent encounter 138. But light 136 (and possibly 138) may be diffracted in the forward direction 136 with RHC polarization. This light 136 will be transformed by the retarder MTR-R1 of the film assembly 121 into TM polarized 137 light where it may be effectively blocked by the polarizer 122. But light 138 (and possibly 136) may be diffracted in the forward direction with LHC polarization. This light 138 may be transformed by retarder MTR-R1 into TE polarized light 139, which may pass through the polarizer of the film assembly and away from the user as forward light leakage 134.

Further embodiments described herein may provide assemblies of one or more optical elements that are configured to effectively address the rainbow effect and/or forward light projection in combination with multiple waveguides, which as noted above may be used to increase the field of view of diffractive waveguide displays or other imaging systems. In the embodiments described below; each waveguide may be configured to operate on light of a particular or respective wavelength range, where the respective wavelength ranges may or may not correspond to respective colors of light, and may or may not overlap with one another.

Figure 5A:
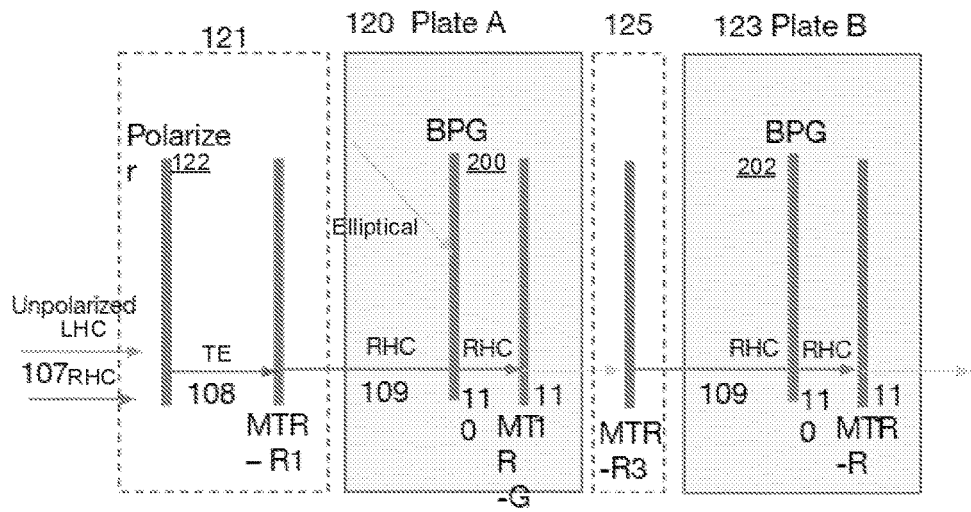
FIGS. 5A and 5B are schematic diagrams illustrating rainbow reduction and forward light leakage reduction, respectively, in multi-waveguide diffractive waveguide devices according to some embodiments of the present invention.
Figure 5B:
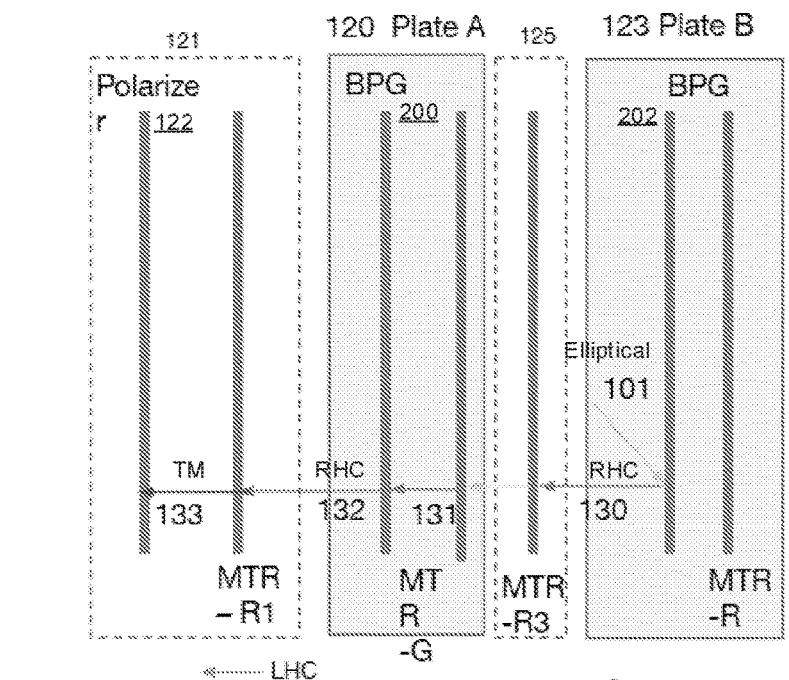

In some embodiments, as shown in FIGS. 5A and 5B, a first optical waveguide 120 (Plate A) includes or is otherwise optically coupled to a first diffractive layer 200, illustrated in this example as a first BPG that is designed or otherwise configured to provide high diffraction efficiency for light of one polarization state (in this example, LHC), and to provide low diffraction efficiency for light of a different (e.g., orthogonal) polarization state (in this example, RHC). A second optical waveguide 123 (Plate B) includes or is otherwise optically coupled to a second diffractive layer 202, illustrated in this example as a second BPG, and is arranged to interact with light output from the first optical waveguide 120 (and vice versa). The embodiments of FIGS. 5A and 5B may be similar to FIGS. 3A and 3B, that is, with a film assembly 121 including a polarizer 122 and retarder MTR (shown as MTR-R1) arranged at the front (e.g., facing the field of view or environment) of the first waveguide 120. A spatially varying retarder MTR-G is included in the first waveguide 120 and configured to interact with light from the first BPG 200 in order to generate a gradient of diffraction efficiency. In some embodiments, another spatially varying retarder MTR-R is included in the second waveguide 123 and configured to interact with light from the second BPG 202 in order to generate a gradient of diffraction efficiency.

As shown in FIG. 5A, in order to address the rainbow effects that may be caused by the addition of the second waveguide 123 in combination with the spatially varying retarder MTR-G, another, second film assembly 125 is arranged between the first waveguide 120 and the second waveguide 123. The second film assembly 125 includes a second spatially varying retarder MTR-R3. As denoted by the dashed lines, the second spatially varying retarder MTR-R3 is illustrated above as mounted independently, either as a suspended film or on its own substrate, and may define one or more air interfaces between the first and second waveguides 120 and 123. The second spatially varying retarder MTR-R3 is configured to "undo" (or counteract or compensate for) the optical effects of the first spatially varying retarder MTR-G, that is, to convert the light 111 into (in this example, RHC polarized) light output 109 that is configured to have low diffraction by the second BPG of the second waveguide 123. That is, the second spatially varying retarder MTR-R3 is configured to correct the effects of the first spatially varying retarder MTR-G (and in some embodiments, may be configured to provide the inverse spatial variation of the retarder MTR-G).

As shown in FIG. 5B, in order to address the forward light projection that may be caused by the addition of the second waveguide 123 in combination with the spatially varying retarder MTR-G, the second film assembly 125 including the second spatially varying retarder MTR-R3 is provided in a manner similar to as described above with reference to FIG. 5A. The second spatially varying retarder MTR-R3 is configured to "undo" (or compensate for) the effects of the first spatially varying retarder MTR-G, that is, to convert the forward projected light 130 from the second BPG 202 of the second waveguide 123 to (in this example, RHC polarized) light 130 that is configured to have low diffraction by the first BPG 200 of the first waveguide 120. The light 132 exiting the first BPG 200 will remain (in this example) RHC polarized and may be effectively blocked by the retarder MTR-R1 and polarizer in the film assembly 121.

Figure 6A:
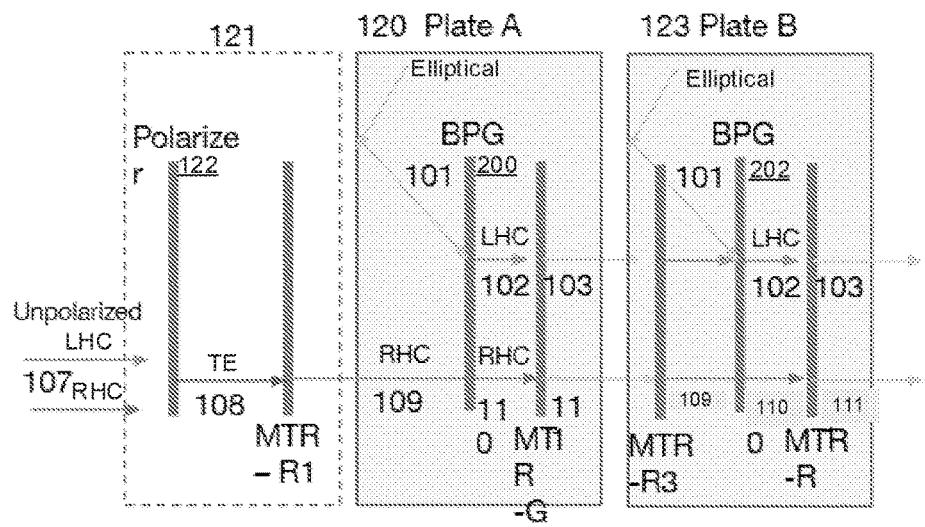
FIGS. 6A and 6B are schematic diagrams illustrating rainbow reduction and forward light leakage reduction, respectively, in multi-waveguide diffractive waveguide devices according to further embodiments of the present invention, with fewer elements and interfaces in comparison to FIGS. 5A and 5B.
Figure 6B:
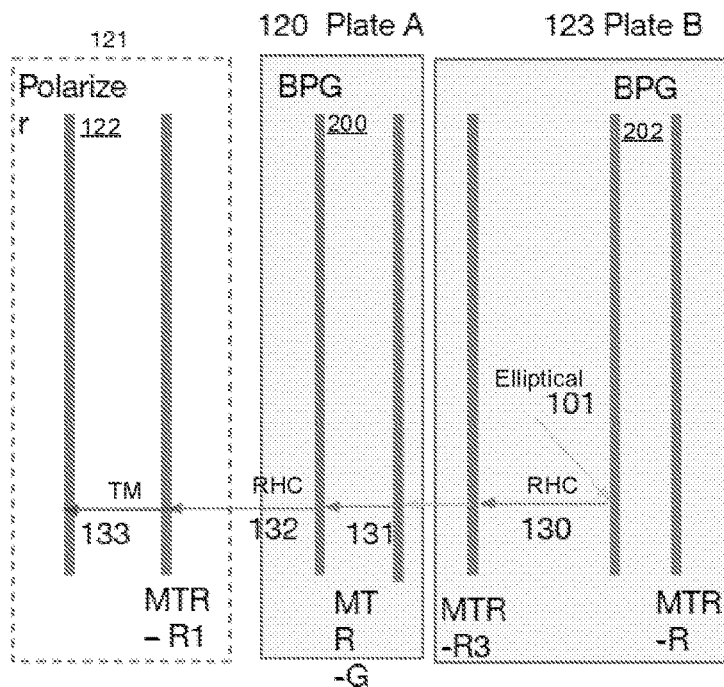

In some embodiments, as shown in FIGS. 6A and 6B, an arrangement similar to those of FIGS. 5A and 5B may be achieved with fewer substrates or interfaces, respectively. In particular, in order to reduce the number of substrates, the second spatially varying retarder MTR-R3 is included in the second waveguide 123. As part of the second waveguide 123, the second spatially varying retarder MTR-R3 may thus also interact with the display light 101. In the example of FIG. 6A, the (here, third) spatially varying retarder MTR-R of the second waveguide 123 (which was configured to control the polarization state of light in order to generate a gradient of diffraction efficiency for the second BPG in the embodiment of FIG. 5A) is instead or further configured to compensate for the function of the second spatially varying MTR-R3 for the display light 102 (in this example, LHC polarized) and work in concert together. That is, the third spatially varying retarder MTR-R may be configured to compensate for optical effects of the second spatially varying retarder MTR-R3, which (in the example of FIGS. 6A and 6B) are both included in the second waveguide 123. The embodiments of FIGS. 6A and 6B may otherwise operate similarly to the embodiments of FIGS. 5A and 5B to reduce or prevent rainbow effects and forward light projection, respectively.

Figure 7A:
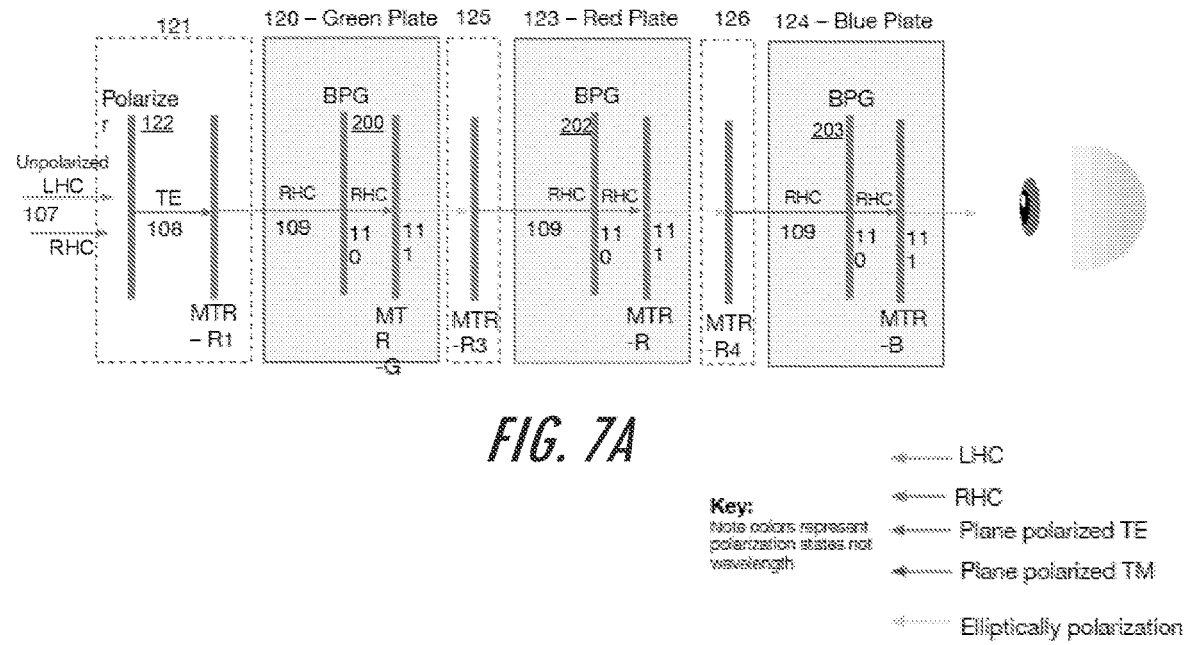
FIGS. 7A and 7B are schematic diagrams illustrating rainbow reduction and forward light leakage reduction, respectively, in multi-waveguide diffractive waveguide devices according to still further embodiments of the present invention.
Figure 7B:
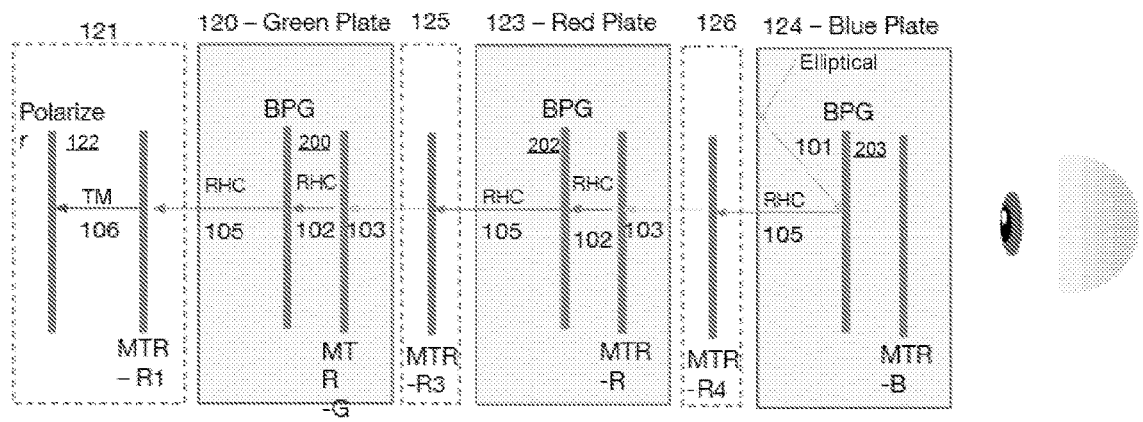

In some embodiments, as shown in FIGS. 7A and 7B, a first optical waveguide 120 (Green Plate) includes or is otherwise optically coupled to a first diffractive layer 200, illustrated in this example as a first BPG that is designed or otherwise configured to provide high diffraction efficiency for light of one polarization state (in this example, LHC), and to provide low diffraction efficiency for light of a different (e.g., orthogonal) polarization state (in this example, RHC). A second optical waveguide 123 (Red Plate) includes or is otherwise optically coupled to a second diffractive layer 202, illustrated in this example as a second BPG, and is arranged to interact with light output from the first optical waveguide 120 (and vice versa). A third optical waveguide 124 (Blue Plate) includes or is otherwise optically coupled to a third diffractive layer 203, illustrated in this example as a third BPG, and is arranged to interact with light output from the second optical waveguide 123 (and vice versa). Each of the waveguides 120, 123, and 124 may include a respective spatially varying retarder (MTR-G, MTR-R, and MTR-B, respectively) that is configured to interact with light from the respective BPG (200, 202, and 203, respectively) in order to generate a gradient of diffraction efficiency.

The embodiments of FIGS. 7A and 7B may be similar to FIGS. 5A and 5B, that is, with a film assembly 121 including a polarizer 122 and retarder MTR (shown as MTR-R1) arranged at the front (e.g., facing the field of view or environment) of the first waveguide 120, with a second film assembly 125 including a second spatially varying retarder MTR-R3 arranged between the first waveguide 120 and the second waveguide 123. In addition, a third film assembly 126 includes a (fourth) spatially varying retarder MTR-R4 arranged between the second waveguide 123 and the third waveguide 124. As noted by the dashed lines, the second spatially varying retarder MTR-R3 and/or the third spatially varying retarder MTR-R4 may be mounted independently, either as a suspended film or on its own substrate, and may define one or more air interfaces between the first and second waveguides 120 and 123 and the second and third waveguides 123 and 124, respectively.

In the example of FIGS. 7A and 7B, the plates are identified as Green 120, Red 123, and Blue 124. However, in other embodiments, the waveguides 120, 123, and 124 may have a different sequence, may be fewer or greater in number, and/or may correspond to different colors or other respective (overlapping or non-overlapping) wavelength ranges. The embodiments of FIGS. 7A and 7B may operate similarly to the embodiments of FIGS. 5A and 5B to reduce or prevent rainbow effects and forward light projection, respectively, with the understanding that the inclusion of each additional waveguide (e.g., 123 and 124) and spatially varying MTR (e.g., MTR-R and MTR-B) to generate a gradient in the diffraction efficiency may require additional counteracting intermediate spatially varying retarders (e.g., MTR-R3 and MTR-R4 of intervening film assemblies 125 and 126), respectively.

Figure 8A:
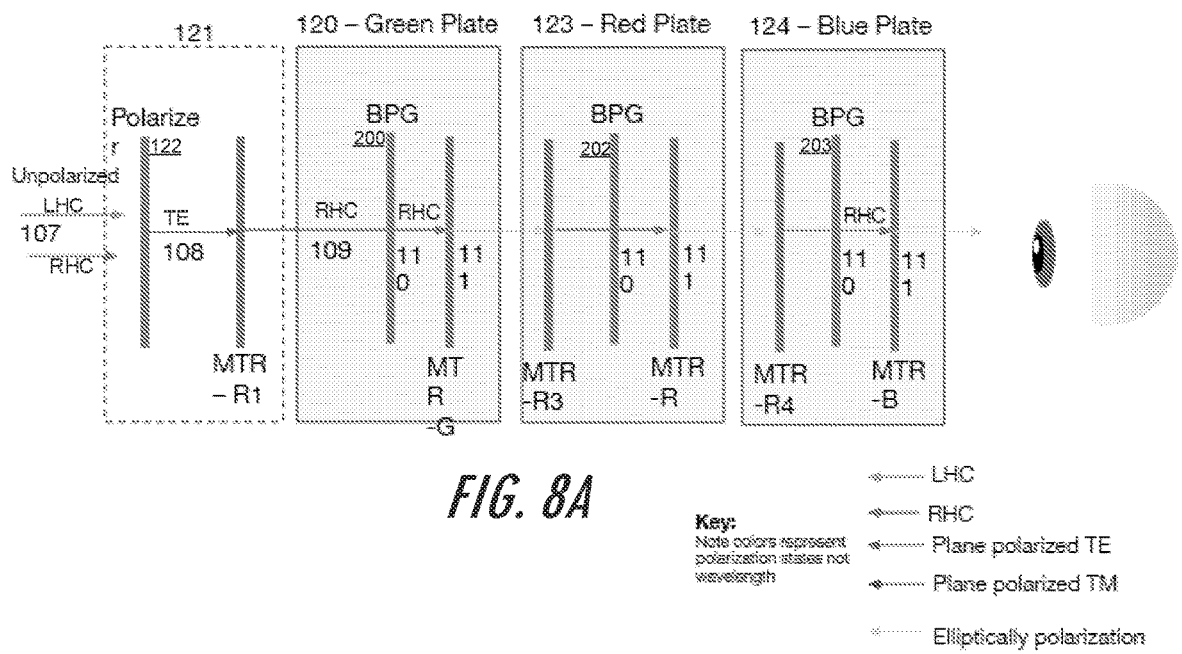
FIGS. 8A and 8B are schematic diagrams illustrating rainbow reduction and forward light leakage reduction, respectively, in in multi-waveguide diffractive waveguide devices according to yet further embodiments of the present invention, with fewer elements and interfaces in comparison to FIGS. 7A and 7B.
Figure 8B:
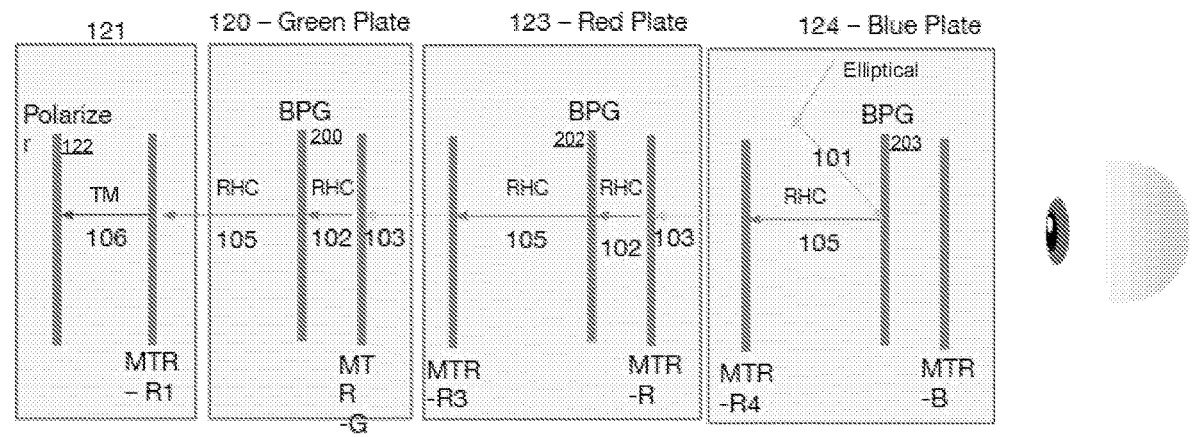

In some embodiments, as shown in FIGS. 8A and 8B, an arrangement similar to those of FIGS. 7A and 7B may be achieved with fewer substrates or interfaces, respectively. In particular, in order to reduce the number of substrates, the intermediate spatially varying correction retarders (MTR-R3 and MTR-R4) are included in an adjacent substrate or waveguide (123 and 124), respectively. The spatially varying retarders MTR-R and MTR-B may be configured to counteract (e.g., by providing the inverse spatial variation of) or otherwise compensate for optical effects of the spatially varying retarders MTR-R3 and MTR-R4, respectively, to manage the diffraction efficiency as similarly discussed above. The retarders described herein may be configured to operate over a wide spectrum of wavelength ranges (i.e., may be achromatic), and may be configured to operate across a wide range of incident light angles. The retardation on the light passing through one spatially-varying retarder may be configured to be counteracted by passing through a subsequent spatially-varying retarder, in both the forward and reverse directions. More generally, in embodiments including multiple spatially varying retarders, the configuration of each subsequent spatially varying retarder may be based on the function of a previous or preceding spatially varying retarder (in a direction from the field of view/ operating environment/unpolarized light 107 towards the eye of the user). The embodiments of FIGS. 8A and 8B may otherwise operate similarly to the embodiments of FIGS. 7A and 7B to reduce or prevent rainbow effects and forward light projection, respectively.

Figure 9A:
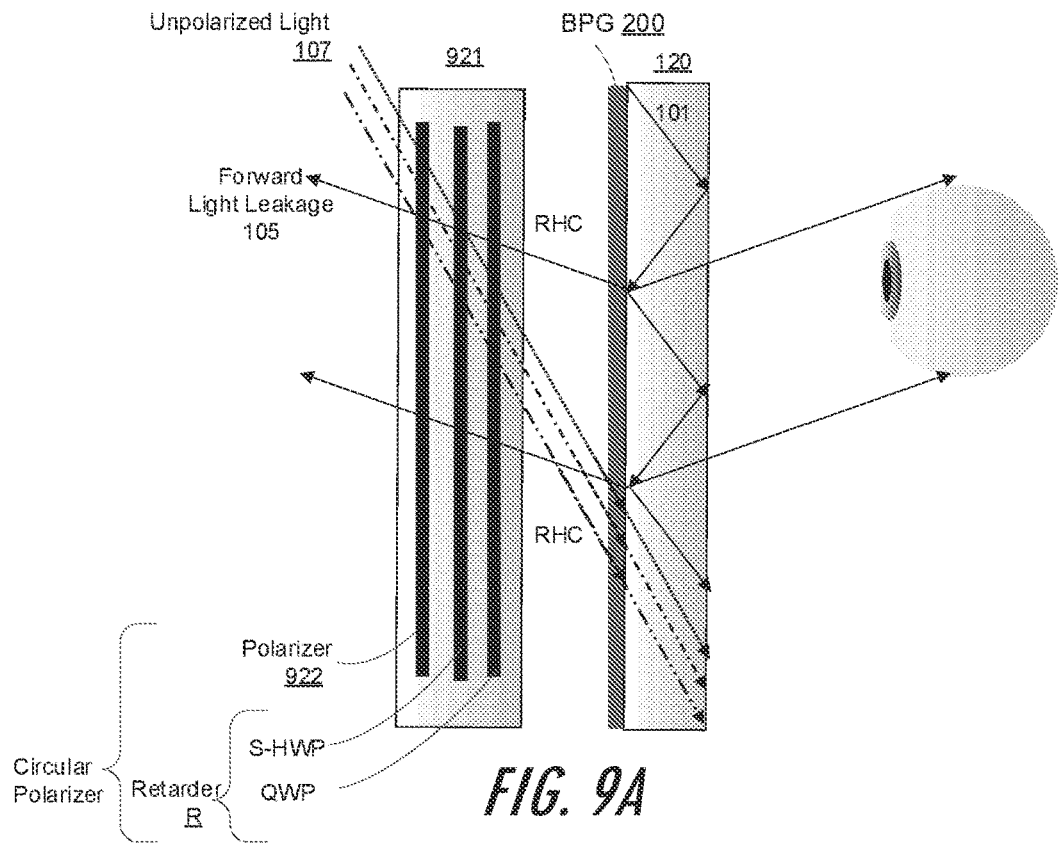
FIGS. 9A and 9B are schematic diagrams illustrating rainbow reduction and forward light leakage reduction, respectively, in a diffractive waveguide device including a polarizing film assembly with a switchable retarder element according to some embodiments of the present invention.
Figure 9B:
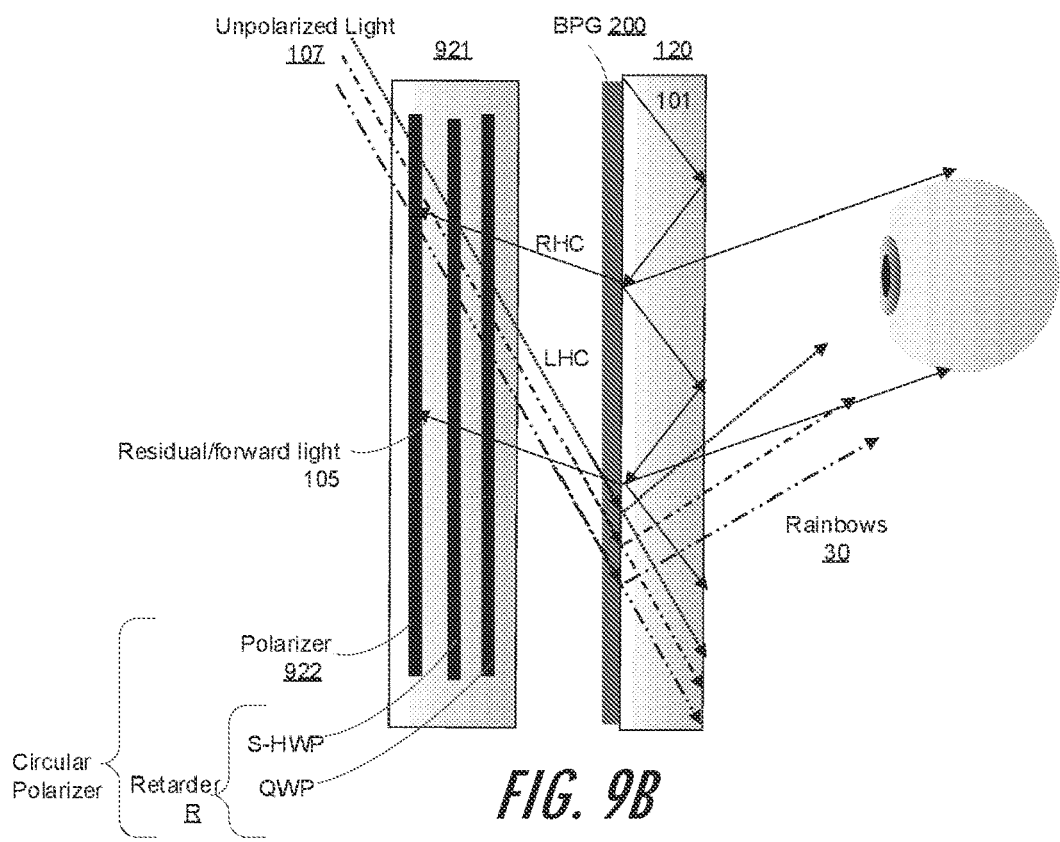

FIGS. 9A and 9B illustrate a diffractive waveguide device including a polarizing film assembly 921 that is configured to be switched between first and second operating modes or retardation states to provide rainbow reduction and forward light leakage reduction, respectively, according to some embodiments of the present invention. The polarizing film assembly 921 may implement a switchable circular polarizer that can be switched between two states, so as to transmit light of either a first polarization (e.g., LHC) or a second polarization (e.g., RHC) to the optical waveguide 120. For example, the polarizer 922 may be a linear polarizer, and the optical retarder R may include switchable retarder element S-HWP followed by a quarter waveplate QWP, or vice versa. The switchable retarder element S-HWP may be implemented as a switchable half waveplate having two modes or retardation states, with one retardation state providing zero retardation, and the other providing halfwave retardation.

As shown in FIG. 9A, in a first operating mode or retardation state, the switchable retarder element S-HWP transforms the polarization of the unpolarized input light 107 that is transmitted through the linear polarizer into the second polarization (e.g., RHC) to provide the light of the second polarization to the optical waveguide 120. The BPG optically coupled to the waveguide 120 is configured to diffract RHC polarized light with low diffraction efficiency, and thus the RHC polarized light is transmitted through the BPG without substantially altering polarization or propagation direction, and therefore rainbow effects or artifacts (which may otherwise be caused by diffraction by the BPG in the waveguide 120) can be reduced or prevented.

As shown in FIG. 9B, in a second operating mode or retardation state, the switchable retarder element S-HWP transforms the polarization of the unpolarized input light 107 that is transmitted through the linear polarizer into the first polarization (e.g., LHC) to provide the light of the first polarization to the optical waveguide 120. The diffractive element 200 (shown as a BPG) is optically coupled to the waveguide 120 is configured to diffract LHC polarized light with high diffraction efficiency, altering polarization and propagation direction such that rainbow effects or artifacts 30 may be formed. However, residual light 105 outcoupled from the waveguide 120 may be transformed (e.g., into the second polarization) and diffracted in the forward direction, and the residual light 105 may be transformed by the S-HWP into a polarization to be blocked by the polarizer 922. Therefore, forward leakage of display light that is diffracted out of the waveguide 120 in a direction away from the user can be reduced or prevented.

As such, the polarizing film assembly 921 is configured to transmit the light of the second polarization to the waveguide 120 in the first retardation state, and to transmit the light of the first polarization to the waveguide 120 and block the light of the second polarization from the waveguide 120 in the second retardation state. In some embodiments, the diffractive waveguide device may further include a second S-HWP and a second polarizer arranged at the front of the device and configured to provide dimming. A switchable half waveplate in between two polarizers is sometimes called an LC-shutter. For example, a LC-shutter may be configured to reduce light transmitted therethrough by orienting the linear polarizer axis either orthogonal or parallel to each other. The switchable half waveplate may be switchable between two modes or states, which are configured to provide either null or half wave retardation, and hence present the second polarizer with polarized light whose optical axis is either parallel to or orthogonal to the optical axis of the second polarizer. In some embodiments described herein, the presence of a second polarizer and switchable half waveplate may not present a significant additional loss with respect to the transmission of non-display light in AR applications, but can provide significant dimming. In AR applications, dimming of the transmitted light from the outside world may enhance the see-through luminance contrast of the virtual content provided by the display light. This can be advantageous, particularly when the display device is used outdoors, where the luminance of direct sunlight and sunlight reflected off objects such as concrete buildings may be relatively high and may otherwise require display luminance to be uncomfortably high in order to view the virtual content with reasonable contrast.

Figure 10A:
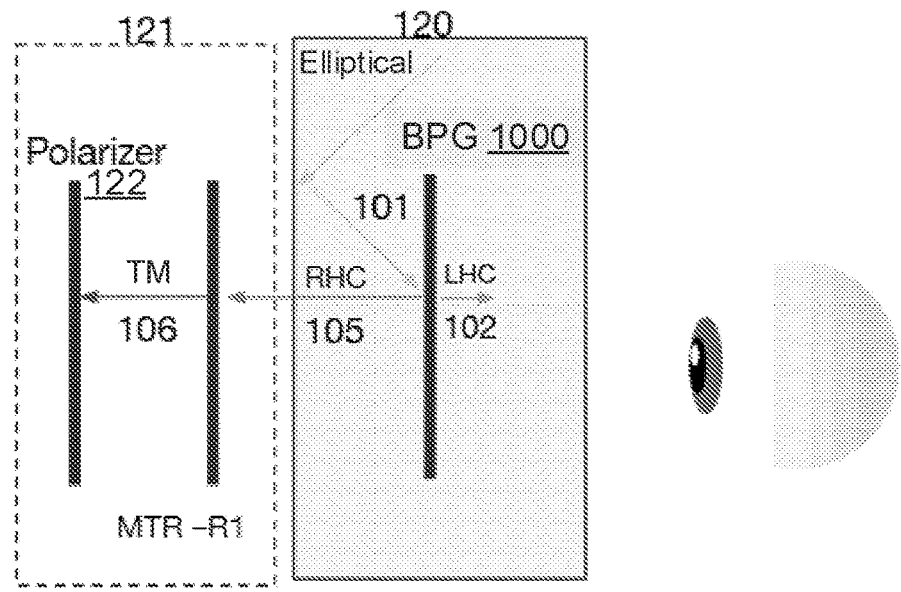
FIG. 10A is a schematic diagram illustrating forward light leakage reduction in a diffractive waveguide device including a multi-slant polarization grating according to some embodiments of the present invention.
Figure 10B:
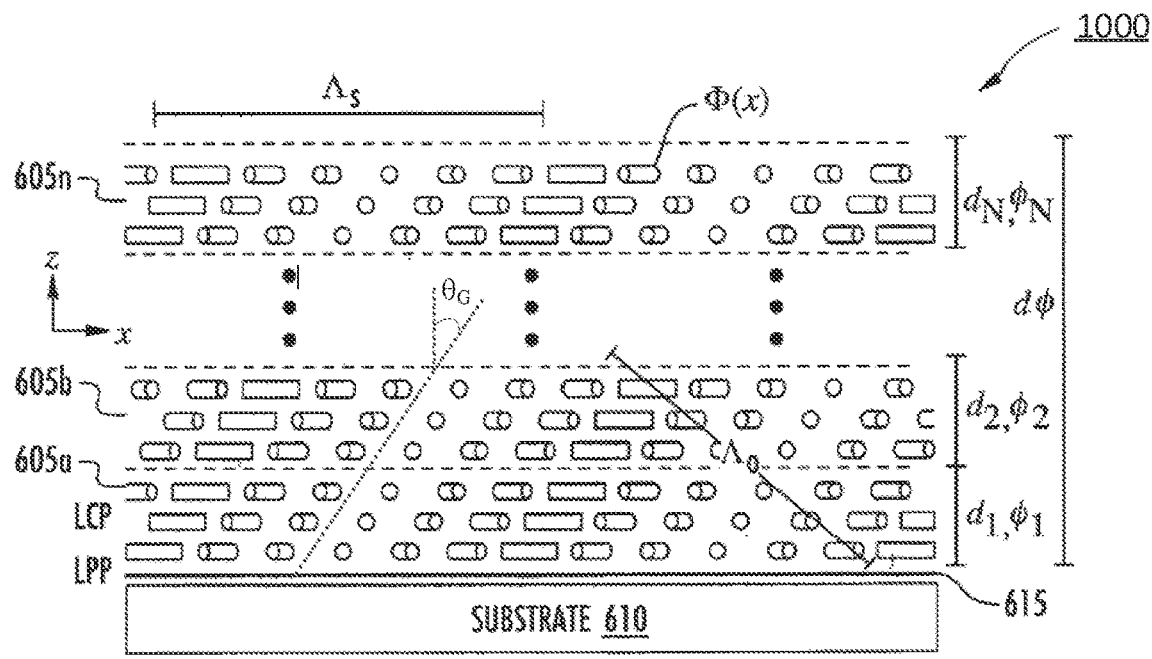
FIG. 10B is a schematic diagram illustrating the multi-slant polarization grating of FIG. 10A in greater detail.

FIG. 10A is a schematic diagram illustrating forward light leakage reduction in a diffractive waveguide device including a multi-slant polarization grating according to some embodiments of the present invention. FIG. 10B is a schematic diagram illustrating the multi-slant polarization grating of FIG. 10A in greater detail. As shown in FIG. 10A, the optical waveguide 120 includes a transparent substrate that is configured to reflect the display light 101 from an electronic imaging display internally via total internal reflection, such that the display light 101 propagates within the waveguide 120. A polarization grating 1000 (shown here as a BPG) is configured to diffract the display light 101 to be outcoupled from a surface of the waveguide 120 towards a user. In particular, the BPG 100 alters the polarization and propagation direction of the display light 101 and outputs light 102 for outcoupling from the waveguide 120. The light 102 that is diffracted by the BPG 100 into the first-order will have a designed polarization (here, LHC), which may be determined primarily by the configuration of the BPG 100 itself. The BPG 1000 is also configured to simultaneously direct residual light 105 of a different polarization (here, RHC) toward the opposite surface of the optical waveguide 120, where the residual light 105 that is outcoupled has a lower intensity than the output light 102. For example, a ratio of the intensity of the display light 102 that is outcoupled from the surface of the optical waveguide 120 compared to that of the residual light 105 that is outcoupled from the opposing surface of the optical waveguide 120 may be greater than about 10 to 1, thereby reducing forward light leakage effects.

For example, the BPG 1000 may be formed as a plurality of stacked birefringent sublayers (e.g., multiple LC sublayers) defining a grating in a Bragg regime. The stacked birefringent sublayers respectively include local optical axes that vary along respective interfaces between adjacent ones of the stacked birefringent sublayers to define respective grating periods. The local optical axes also vary over respective thicknesses of the sublayers to define respective twist angles or chirality parameters.

As shown in the example of FIG. 10B, the BPG 1000 includes thin LCP sublayers 605a, 605b, . . . 605n, which may be formed on a patterned photo alignment layer 615 (e.g., an LPP layer) on a substrate 610. The LCP sublayers 605a, 605b, . . . 605n each have a respective thickness ($d_1$, $d_2$, . . . , $d_N$), as well as a respective chiral parameter or twist ($\phi_1, \phi_2, \ldots, \phi_N$) adding up to a total thickness d and a total twist of $\phi$ for the overall element 1000. In other words, the liquid crystal molecule orientations of one or more of the sublayers 605a, 605b, . . . 605n define local optical axes that vary not only along the respective interfaces between the sublayers 605a, 605b, . . . 605n, but also vary over the respective thicknesses $d_1, d_2, \ldots, d_N$ of the sublayers 605a, 605b, . . . 605n to define respective twist angles $\phi_1$, $\phi_2, \ldots, \phi_N$. This achieves a "slanted" Bragg LC PG, analogous to the angular slant of the periodic structures in some conventional slanted Bragg gratings. Each of the sublayers 605a, 605b, . . . 605n has a respective sublayer or surface grating period $\Lambda_s$ which defines the overall optical grating period $\Lambda_0$ for the element 1000 (also referred to as the optical element grating period $\Lambda$). The optical element grating period $\Lambda$ is less than the sublayer grating period $\Lambda_s$ in the slanted Bragg LC PG shown in the embodiment of FIG. 10B, but may be equal to the sublayer grating period $\Lambda_s$ in other embodiments.

The grating slant angle $\theta_G$ may depend on the grating period $\Lambda$, sublayer thickness d, and/or sublayer chirality parameter or twist angle $\phi$, for example, according to the equation $\tan \theta_{Gi} = \phi_i \Lambda / d_i \pi$, where $\phi_i$ and $d_i$ are the twist angle and thickness of the ith layer, respectively. This slant may be achieved via the spontaneous helical twisting action of the chiral nematic LCP material itself in each sublayer 605a, 605b, . . . 605n, and provides additional control over the incident Bragg angle and/or the first order diffraction angle, allowing it to be modified to be larger or smaller compared to an otherwise equivalent unslanted (i.e., non-chiral) version. Chiral molecules may be added to a non-chiral nematic LC to control the twist angle precisely. The sublayers 605a, 605b, . . . 605n may each have the same thickness and twist, but embodiments of the present invention are not so limited, and may include sublayers 605a, 605b, . . . 605n with different thicknesses and/or twists, thereby providing a multi-slant grating, with two or more sublayers 605a, 605b, . . . 605n having different slant angles. Such gratings are described in greater detail in U.S. Patent Application Publication No. 2016/0033698 to Escuti et al., the disclosure of which is incorporated by reference herein. In some embodiments, the sublayers 605a, 605b . . . 605n may define a transmission grating with respective slant angles between about 15 to 45 degrees, and respective thicknesses between about 0.5 to 1.2 microns. In some embodiments, the sublayers 605a, 605b, . . . 605n may define a reflection grating with respective slant angles between about 50 to 70 degrees, and respective thicknesses between about 0.7 to 1 micron. At least two of the respective thicknesses, slant angles, and/or chirality parameters may be different among the stacked birefringent sublayers 605a, 605b, . . . 605n.

Referring again to FIG. 10A, the BPG 1000 may be configured such that the display light 102 to be outcoupled from the waveguide 120 includes the light of the first (e.g., LHC) polarization, and is substantially free of the light of the second polarization (e.g., RHC). Conversely, the residual light 105 to be outcoupled from the waveguide 120 includes the light of the second (e.g., RHC) polarization, and is substantially free of the light of the first (e.g., LHC) polarization. While illustrated in FIG. 10A as a transmissive grating, it will be understood that the BPG 1000 may be a reflective grating, such that the display light 101 may be incident is on the side of the BPG 1000 adjacent the user, with the first-order diffracted light 102 also being directed back toward the user.

In some embodiments, a polarizing film assembly 121 may be optionally provided on the optical waveguide 120 and diffractive element 1000 as shown in FIG. 10A, e.g., opposite the surface that is configured to face the user, to provide non-display light of the second polarization (e.g., RHC) to the waveguide 120, similar to the configurations shown in any of the embodiments of FIGS. 2A to 9B described above. As such, the diffractive waveguide device of FIG. 10A may reduce or eliminate forward leakage of the residual light 105 (which may be transformed by the retarder MTR-R1 and blocked by the polarizer), and may also be configured to reduce or eliminate see-through rainbows effects or artifacts (by providing light primarily of the second polarization to the waveguide 120, which may not be substantially diffracted by the BPG 1000).

Figure 11:
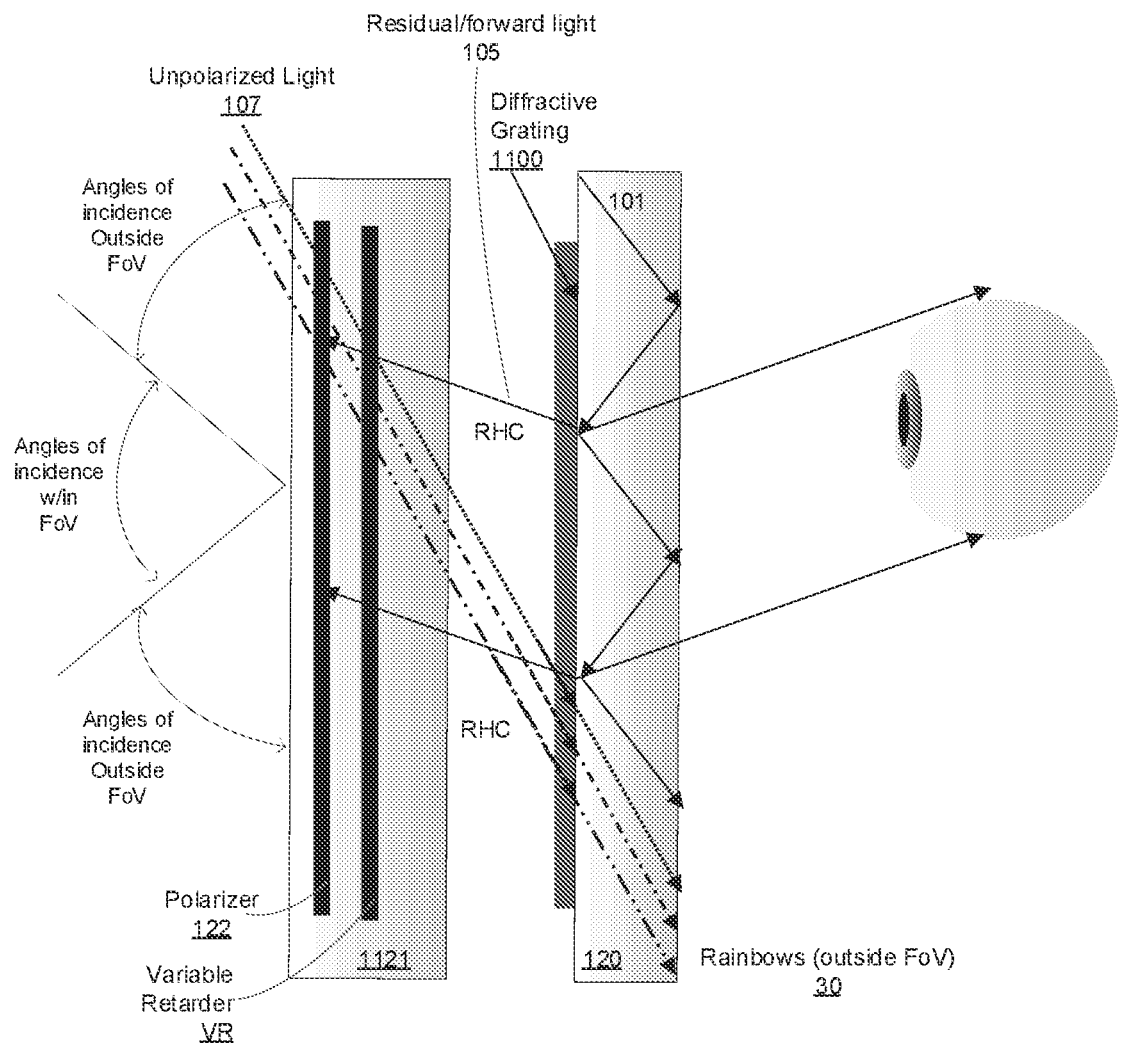
FIG. 11 is a schematic diagram illustrating rainbow reduction and forward light leakage reduction in a diffractive waveguide device including a polarizing film assembly with a variable retarder element according to some embodiments of the present invention.

FIG. 11 is a schematic diagram illustrating rainbow and forward light leakage reduction in a diffractive waveguide device including a polarizing film assembly 1121 with a variable retarder element VR according to some embodiments of the present invention. As mentioned above, see-through rainbow artifacts may be formed by diffractive waveguides when light at relatively high angles of incidence (e.g., outside the field of view of the device) are not diffracted into angles that are greater than the critical angle of the glass. More generally, the angles of incidence that result in rainbow artifacts may be outside the field of view of the diffractive waveguide display, for instance, when the display includes a cross grating to propagate light out of the waveguide and into the user's eye. Also, forward light leakage may result from light that is propagated within the waveguide by TIR and within the field of view of the display.

In further embodiments of the present invention, a variable retarder element VR is configured based on the boundary conditions described above, so as to reduce or prevent both see-through rainbows and forward light leakage simultaneously. For example, to reduce rainbows for a diffractive grating that is configured to diffract LHC light with high efficiency, the polarizing film assembly 1121 may implement a circular polarizer configured to transmit RHC light to the grating for angles of incidence beyond or outside of the field of view of the display, which may induce rainbows. To reduce forward light leakage for a grating that is configured to diffract LHC light with high efficiency, the polarizing film assembly 1121 may implement a circular polarizer configured to transmit LHC light for the angles of incidence within the field of view of the display, which may provide forward light leakage. The variable retarder VR may be configured to provide angle-specific retardation, such that transmitted rainbows are reduced or prevented, while blocking forward light leakage.

More particularly, referring now to FIG. 11, the diffractive element is shown as a diffractive grating 1100 (which may be, but is not necessarily, a BPG in some embodiments) that is optically coupled to an optical waveguide 120. The optical waveguide may be a transparent substrate that is configured to propagate light 101 (e.g., from an electronic imaging display) by total internal reflection, and the diffractive grating may be configured to diffract the light 101 out of the waveguide 120 and towards the users' eyes. The diffractive grating 1100 is configured to provide high diffraction efficiency (e.g., to alter propagation into a first-order direction) for a first (e.g., LHC) polarization, and to provide low diffraction efficiency (e.g., to transmit without substantially altering propagation direction, into a zero-order direction) for a second (e.g., RHC) polarization.

The polarizing film assembly 1121 includes a polarizer 122 (e.g., a linear polarizer) and a variable retarder element VR, and is arranged to direct non-display light to the waveguide 120. To reduce or eliminate rainbows 30 at the user's eye, the variable retarder element VR is configured to transform light into the second polarization state for ambient or unpolarized light 107 having angles of incidence greater than the field of view of the diffractive waveguide display. In some embodiments (e.g., where the diffraction grating is a BPG), forward light leakage 105 may be outcoupled in the second polarization. To block forward light leakage 105, the variable retarder VR is configured to transform light of the second polarization into polarized light (e.g., linearly polarized) that can be blocked by the polarizer (e.g., in the orthogonal polarization to the light that is transmitted by the linear polarizer) for angles of incidence within the field of view of the display. More generally, the diffractive grating 1100 may be configured to diffract light 105 in the forward direction (i.e., away from the user) having a substantially a single or same polarization (i.e., substantially free of other or orthogonal polarizations) for angles within the field of view, and the variable retarder element VR may be configured to transform this light into a polarization that can blocked by the linear polarizer 122.

Even more generally, the forward light leakage 105 may have a polarization that may vary in angle of incidence, wavelength/spectrum, and/or with spatial position across the surface of the diffraction grating. That is, the outcoupled or residual light 105 diffracted in the forward direction (away from the user's eye) may have a polarization that may be angularly dependent, spectrally dependent, and/or positionally dependent. The variable retarder element VR may be configured (for angles of incidence of the light 105 within the field of view) to transform the polarization of this forward light 105 into a polarization that can be blocked by the polarizer of the polarizing film assembly 1121 (e.g., into a linear polarization that is orthogonal to the linear polarization of the light transmitted by the linear polarizer 122). In some embodiments, the variable retarder VR may include multiple stacked birefringent sublayers, with local optical axes that vary across the surface of the sublayers in one or more dimensions or directions. That is, the variable retarder element VR may be configured to vary retardation of light incident thereon based on angle of incidence, wavelength, and/or spatial position in one or more directions along a surface of the variable retarder element VR.

The variable retarder element VR is thus configured to provide a first retardation amount or value for angles of incidence within a field of view of the device, and a second retardation amount or value for angles of incidence beyond or outside the field of view. The polarizing film assembly 1121 is configured to provide the light of the second polarization to the optical waveguide for the angles of incidence outside the field of view, and to block the light of the second polarization that is outcoupled from the optical waveguide 120 for the angles of incidence within the field of view.

In embodiments described herein, the retarder(s) may be arranged directly on or adjacent to the diffractive element, or separated therefrom, e.g., on the opposite side of a waveguide. In some embodiments, the retarder(s) and/or the diffractive layer(s) may include birefringent materials or layers, such as (but not limited to) liquid crystal (LC) layers. In some embodiments, the retarder(s) and diffractive layer(s) may define an optical element having a monolithic structure. The layers of the monolithic optical element may be directly on one another, or may include one or more transparent layers therebetween.

Embodiments of the present disclosure may thereby provide diffractive optical waveguide displays that include one or more optical waveguides configured to direct display and non-display light into respective polarization states (rather than mixed polarizations) to a user, as well as a polarizing film assembly that is configured to reduce or prevent rainbow effects and/or forward light leakage. While some embodiments have been described herein with reference to waveguide-based or other near-to-eye imaging systems, it will be understood that embodiments of the present disclosure are not so limited, and may be used in other applications as well.

Although illustrated in the examples described herein with reference to particular configurations of optical element stacks, it will be understood that intervening elements, such as additional polarizers, retarders, and/or other optical layers, may also be present. For example, depending on the characteristics of the PG element, a particular polarization of the light emission may be needed to provide the desired diffraction angles. As such, if a light source emits polarized light (e.g., a laser), a waveplate (e.g., a quarter waveplate to provide circular polarization) may be included to provide light emission with the desired input polarization. Likewise, if the light source does not emit polarized light (e.g., an LED), a polarizer may be included to provide light emission with the desired input polarization.

Embodiments of the present disclosure have been described with reference to diffractive optical elements, such as polarization gratings, that are configured to alter both the polarization and propagation direction of light within an operational wavelength range thereof. PGs are diffractive optical elements formed by patterning thin films with optical anisotropy. More specifically, a PG has a local optical axis that varies linearly (e.g., $\varphi(x)=\pi x/\Lambda$) along at least one direction that is coplanar with the optical axis itself (e.g., the X-Y plane), and has a homogenous anisotropy magnitude, among other features. PGs may provide high diffraction efficiency, limited diffraction orders, and/or polarization selectivity.

In some example implementations, PGs may be fabricated using photo-alignment and liquid crystal (LC) materials, in both switchable and polymerizable LCs. In the latter case, PGs may be formed as multiple sublayers of LCs with a single alignment layer. By adding chiral dopants to reactive mesogens, also called low-molecular weight polymerizable LCs (LCPs), a chiral twist in each layer may be achieved. This chiral twist can be used to tailor the bandwidth of high diffraction efficiency.

The interaction of light with diffraction gratings can be affected by a complex combination of both material and geometric parameters. It may be common in the field of diffraction gratings to use a dimensionless parameter Q to identify the regime of the optical behavior of a particular grating configuration:

$$Q=2\pi\lambda d/\Lambda^2 n$$

where $\lambda$ is the vacuum wavelength of light, d is the grating thickness, $\Lambda$ is the grating period of the optical element (i.e., pitch), and n is the average refractive index. In this framework, the Bragg regime can be defined as $Q>1$, the Raman-Nath regime can be defined as $Q<1$, and $Q\sim 1$ may refer to a mixed regime with properties of both.

Embodiments described herein provide PGs with both large diffraction angles θ of up to about 90° (i.e., λ approaching Λ) and high efficiency. Bragg PGs formed with LC materials having grating period Λ, thickness d, and/or average refractive index n selected such that the Bragg condition (Q>1) is attained for the wavelength of operation may make this possible. Bragg PGs refer to polarization gratings that operate in the Bragg regime, which have higher diffraction efficiency (in comparison to some non-Bragg PGs) and are designed to operate in a single diffraction order (rather than multiple diffraction orders of some non-Bragg PGs). More specifically, embodiments of the present invention can employ multiple stacked birefringent sublayers (which may have respective thicknesses that are less than the operational wavelength of the light to be passed therethrough), individually coated and polymerized, to achieve the large thicknesses required for the Bragg regime.

In some embodiments, Bragg PGs may be formed using bulk nematic LC layers, which can be described as polymerized reactive LC monomer layers, or LC polymer (LCP) layers. LCP layers are distinct from conventional liquid crystalline polymers. The LCP thin films employed in some embodiments of the present invention include low-molecular-weight reactive LC molecules, which are aligned by characteristics of the surface on which they are coated or otherwise formed, and are subsequently polymerized into a rigid polymer network. In particular, the periodic pattern of the Bragg PG can be recorded into the surface of a photoalignment layer, rather than the LCP layer directly. Conversely, some conventional liquid crystalline polymers may be high-molecular-weight polymers with liquid crystalline components, and the periodic pattern of the Bragg PG is typically directly recorded into the material, for instance, via photoinduced molecular realignment.

A geometric phase (GP) element is an anisotropic optical element having optical axis orientations that vary in one or more dimensions and/or in any manner, including but not limited to linear, nonlinear, and continuous or discontinuous optical axis variations, thereby affecting the polarization of incident light in such a way as to control the geometric phase (or Pancharatnam-Berry phase, which results from a change in polarization states), rather than the dynamic phase (which results from optical path length difference effects).

A GP element can be considered a more complex version of a polarization grating, having a one- or two-dimensional variation of its grating period Λ along a surface thereof. From another point of view, a PG can be considered as merely a particular example of a GPH, implementing a linear phase profile, e.g., $\varphi(x)=\pi x/\Lambda$ or $\varphi(x)=\pi y/\Lambda$, where Λ is the constant grating period. In some embodiments, a non-linear variation of the local optical axis orientations (e.g., $\varphi(x)=k\pi x^2$) in one or more dimensions as a function of position along the surface of the geometric phase element may define a pattern having a continuously varying periodicity, such that the overall effect of the GP element may be to provide a lens effect.

In some instances, the varying optical axis orientations may be generated by patterning a recording medium or other alignment surface using holography techniques, in which case the GP element may be referred to as a geometric phase hologram (GPH) element, or simply a GPH. However, geometric phase elements as described herein can also be created by various methods, including holographic interference and various other forms of lithography, and thus, a 'hologram' as described herein is not limited to creation by holographic interference, or 'holography'.

Embodiments of the present invention are described herein with reference to liquid crystal (LC) materials. As used herein, the liquid crystals can have a nematic phase, a chiral nematic phase, a smectic phase, a ferroelectric phase, and/or another phase. In addition, a number of photopolymerizable polymers may be used as alignment layers to create the GP elements described herein.

It will be understood that, as used herein, a "transmissive" or "transparent" substrate or element may allow at least some of the incident light to pass therethrough. In other words, transmissive or transparent elements described herein need not be perfectly transparent, and may have isotropic or dichroic absorption characteristics and/or may otherwise absorb some of the incident light. A transparent substrate or spacer may be a glass substrate in some embodiments. In contrast, a "reflective" substrate as described herein may reflect at least some of the incident light. An element that "blocks" light (e.g., light of a particular polarization) substantially prevents transmission of such light therethrough.

It will also be understood that anti-reflection coatings may be applied on all surfaces that interface with the ambient medium (e.g., air). It will also be understood that the optical elements/layers described herein may in some cases be laminated together to define a monolithic structure without an air gap in between the elements/layers, and in other cases may be arranged with an air gap in between.

As used herein, "zero-order" light propagates in a direction substantially parallel to that of the incident light, i.e., at a substantially similar angle of incidence, and may be referred to herein as "on-axis" light. In contrast, "non-zero-order light," such as "first-order" light, propagates in directions that are not parallel to the incident light, and is referred to herein as "off-axis" light. "Partially collimated" light, as described herein, may describe light rays or beams that propagate substantially parallel to one another, but may have some divergence (e.g., difference in beam diameter with distance from the source).

As used herein, a "parallel" polarization grating arrangement includes first and second polarization gratings with the same birefringence n (x), i.e., the respective birefringence patterns of the first and second polarization gratings have substantially similar orientations. In contrast, an "antiparallel" polarization grating arrangement includes first and second polarization gratings having opposite birefringence, i.e., n(x) and n(−x). In other words, the second polarization grating has a birefringence pattern that is inverted or rotated by about 180 degrees relative to that of the first polarization grating.

Embodiments of the present invention are described herein with reference to liquid crystal (LC) materials. Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a controllable way.

Also, "polymerizable liquid crystals" may refer to relatively low-molecular weight liquid crystal materials that can be polymerized, and may also be described herein as "reactive mesogens." In contrast, "non-reactive liquid crystals" may refer to relatively low-molecular weight liquid crystal materials that may not be polymerized. However, it will be understood that embodiments of the present invention are not limited to the particular materials described herein, but may be implemented using any and all material layers that function as described herein.

As described herein, switchable layer(s) may be independently switched (responsive to an applied electrical signal) between states that differently affect the polarization of light incident thereon. For example, in some embodiments, the switchable layer(s) may be switched between a first state (e.g., an "off" state) that does not substantially alter a polarization of the light, and a second state (e.g., an "on" state) that alters the polarization of the light (e.g., to an orthogonal polarization state). In some embodiments, the switchable layer(s) may not switch entirely from one polarization state to the orthogonal state, and as such may be used to modulate the light within the specified wavelengths of operation passing therethrough. That is, the switchable layer(s) may include intermediate states (between the "off" and "on" states) with respect to effects on the polarization of the incident light within the specified wavelengths of operation.

The switchable layer(s) may include a birefringent liquid crystal layer that can be electrically switched between zero retardation and half-wave retardation (or other retardations) responsive to a voltage applied thereto. The state (e.g., "on" or "off") of the switchable optical layer may be is controlled by one or more external controllers. In some embodiments, the switchable optical layer(s) may be formed using LC materials, as described for example in U.S. Patent Application Publication No. 2011/0242461 to Escuti et al, the disclosure of which is incorporated by reference herein. LC materials that may be used in accordance with embodiments of the present disclosure include, but are not limited to, twisted-nematic, vertical alignment, blue-phase, etc., without limitation to the particular "on" (halfwave retardation) or "off" (zero retardation) states described herein.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as, illustrated in the figures. It will be understood that the spatially relative terms are intended, to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

That which is claimed:

1. A diffractive waveguide device, comprising:
    an optical waveguide;
    a diffractive element optically coupled to the optical waveguide, wherein the diffractive element is configured to alter a polarization and propagation direction of light of a first polarization, and is configured to transmit light of a second polarization without substantially altering a polarization or propagation direction thereof;
    a polarizing film assembly that is configured to provide the light of the second polarization to the optical waveguide, and/or is configured to block the light of the second polarization from the optical waveguide, wherein the polarizing film assembly comprises a polarizer and an optical retarder that is positioned between the polarizer and the optical waveguide; and a spatially varying retarder configured to vary a diffraction efficiency of the diffractive element in one or more directions.

2. The diffractive waveguide device of claim 1, wherein the polarizing film assembly is arranged to provide the light of the second polarization to the optical waveguide responsive to non-display light that is incident on a surface of the polarizing film assembly that is opposite the optical waveguide, wherein the light of the second polarization is substantially free of the first polarization.

3. The diffractive waveguide device of claim 2, wherein the optical waveguide is configured to transmit the non-display light from a surface of the optical waveguide, wherein the non-display light that is transmitted comprises the light of the second polarization and is substantially free of rainbow artifacts,
wherein the non-display light that is transmitted is substantially free of the light of the first polarization.

4. The diffractive waveguide device of claim 3, wherein the optical waveguide is configured to propagate display light from an electronic imaging display by total internal reflection, and outcouple the display light from the surface of the optical waveguide.

5. The diffractive waveguide device of claim 4, wherein the diffractive element is configured to alter the polarization and the propagation direction of the display light toward the surface of the optical waveguide, wherein the display light that is outcoupled comprises the light of the first polarization,
wherein the display light that is outcoupled is substantially free of the light of the second polarization.

6. The diffractive waveguide device of claim 1, wherein the first and second polarizations are orthogonal to one another.

7. The diffractive waveguide device of claim 1, wherein the optical retarder is a multi-twist retarder comprising stacked birefringent sublayers having respective retardations and respective local optical axes that are rotated by respective twist angles over respective thicknesses thereof, wherein at least two of the respective twist angles and/or the respective thicknesses are different among the stacked birefringent sublayers.

8. The diffractive waveguide device of claim 7, wherein the stacked birefringent sublayers are liquid crystal polymer layers.

9. The diffractive waveguide device of claim 1, wherein:
the optical retarder comprises a switchable retarder element that is configured to be switched between different first and second retardation states; and
the polarizing film assembly is configured to provide the light of the second polarization to the optical waveguide in the first retardation state, and to block the light of the second polarization from the optical waveguide in the second retardation state.

10. The diffractive waveguide device of claim 9, wherein the polarizing film assembly is a switchable circular polarizer.

11. The diffractive waveguide device of claim 9, wherein the polarizer is a linear polarizer, wherein one of the first and second retardation states is configured to provide halfwave retardation, wherein another of the first and second states is configured to provide zero retardation, and wherein the optical retarder further comprises a quarter wave plate between the linear polarizer and the optical waveguide.

12. The diffractive waveguide device of claim 1, wherein the optical retarder comprises a variable retarder element that is configured to vary retardation presented to incident light based on angles of incidence of the incident light, wavelengths of the incident light, and/or spatial positions in one or more directions along a surface of the variable retarder element.

13. The diffractive waveguide device of claim 12, wherein:
the variable retarder element is configured to provide a first retardation for the angles of incidence that are within a field of view of the diffractive waveguide device and a second retardation, which is different from the first retardation, for the angles of incidence that are outside the field of view; and
the polarizing film assembly is configured to provide the light of the second polarization to the optical waveguide for the angles of incidence that are outside the field of view, and block the light of the second polarization from the optical waveguide for the angles of incidence that are within the field of view.

14. The diffractive waveguide device of claim 1, wherein the spatially varying retarder is arranged to receive light output from the diffractive element and is configured to spatially vary retardation of light incident thereon in the one or more directions along a surface thereof.

15. The diffractive waveguide device of claim 14, wherein the spatially varying retarder comprises a local optical axis pattern, twist angle, and/or thickness configured to spatially vary the retardation.

16. The diffractive waveguide device of claim 1, wherein the spatially varying retarder is configured to provide light output with substantially uniform intensity from a surface of the optical waveguide opposite the polarizing film assembly.

17. The diffractive waveguide device of claim 1, wherein the diffractive element and/or the spatially varying retarder are included in the optical waveguide.

18. The diffractive waveguide device of claim 1, wherein the optical waveguide is a first optical waveguide, and wherein the diffractive waveguide device further comprises:
a second optical waveguide arranged to receive light output from the first optical waveguide; and
a second diffractive element optically coupled to the first optical waveguide, wherein the second diffractive element is configured to alter the polarization and propagation direction of light of the first polarization, and is configured to transmit light of the second polarization without substantially altering the polarization or propagation direction thereof.

19. The diffractive waveguide device of claim 18, further comprising:
a second film assembly between the second diffractive element and the first optical waveguide,
wherein the spatially varying retarder comprises a first spatially varying retarder, wherein the second film assembly comprises a second spatially varying retarder that is configured to spatially vary retardation of light incident thereon in one or more directions along a surface thereof.

20. The diffractive waveguide device of claim 19, wherein the second spatially varying retarder comprises a local optical axis pattern, twist angle, and/or thickness configured to spatially vary the retardation inversely to that of the first spatially varying retarder.

* * * * *